United States Patent [19]

Takahashi

[11] Patent Number: 5,260,737
[45] Date of Patent: Nov. 9, 1993

[54] FLASH PHOTOGRAPHING SYSTEM

[75] Inventor: Naoki Takahashi, Kanagawa, Japan

[73] Assignee: Canon Kabushiki Kaisha, Tokyo, Japan

[21] Appl. No.: 686,268

[22] Filed: Apr. 15, 1991

Related U.S. Application Data

[63] Continuation of Ser. No. 503,217, Apr. 2, 1990, abandoned, which is a continuation of Ser. No. 397,711, Aug. 23, 1989, abandoned.

[30] Foreign Application Priority Data

| Aug. 26, 1988 | [JP] | Japan | 63-211699 |
| May 13, 1989 | [JP] | Japan | 1-120139 |
| May 13, 1989 | [JP] | Japan | 1-120140 |
| May 13, 1989 | [JP] | Japan | 1-120141 |

[51] Int. Cl.⁵ ............................ G03B 15/05
[52] U.S. Cl. .................. 354/413; 354/417; 354/420; 354/145.1
[58] Field of Search .......... 354/413, 416, 417, 420, 354/421, 423, 422, 145.1, 415, 456

[56] References Cited

U.S. PATENT DOCUMENTS

| 4,078,242 | 3/1978 | Uchiyama et al. | 354/139 |
| 4,297,011 | 10/1981 | Adams, Jr. | 354/145.1 |
| 4,359,275 | 11/1982 | Hasegawa | 354/416 |
| 4,494,851 | 1/1985 | Maida et al. | 354/145.1 |
| 4,630,917 | 12/1986 | Maida et al. | 354/456 |
| 4,717,934 | 1/1988 | Kobayashi et al. | 354/415 |

Primary Examiner—Russell E. Adams
Attorney, Agent, or Firm—Robin, Blecker, Daley & Driscoll

[57] ABSTRACT

A camera system consisting of a flash device and a camera of the kind performing the so-called TTL flash control action is arranged to permit manual setting of a correction degree for the TTL flash control; to adjust the degree of light quantity control according to the correction degree in performing the TTL flash control; and, when the camera is set into a specific mode, to automatically shift the correction degree to zero to inhibit the light quantity control degree from being changed by the correction degree even if the correction degree has been manually set.

21 Claims, 33 Drawing Sheets (WHEN MIRROR IS DOWN)

(WHEN MIRROR IS UP)

(DISPLAY INSIDE VIEW FINDER)

(PROGRAM OF MICROCOMPUTER 2
WHEN FLASH DEVICE 1 IS INCAPABLE
OF SETTING CORRECTION VALUE)

(COMMUNICATION PROCESSING PROGRAM)

```
OCCURRENCE OF
COMMUNICATION INTERRUPTION
        │
        ▼
    SRbit7=0? ──NO──────────────────┐
   #601  │YES                        │
        ▼                            ▼
     SR=1? ──NO──┐               F=1? ──YES──► CA←0
   #602  │YES     │              #621              #622
        ▼         │                │NO
       F←1        │                │
       #603       ▼                │
        ▼      CA=FFH              │
       CA←0    #611                │
       #604     ▼                  │
        │      F←0 ────────────────┘
        │      #612
        ▼
   INTERRUPTION
     RETURN
```

FIG.25(b)

(MAIN PROGRAM)

```
POWER SUPPLY ON
      │
      ▼
 INITIALIZATION
     #551
      │
      ▼
    F←0
   CA←FFH
    #552
      │
      ▼
 OTHER PROCESS ──┐
    #553         │
      ▲─────────┘
```

FIG.25(a)

(FORMAT OF SERIAL COMMUNICATION BETWEEN CAMERA BODY AND FLASH DEVICE)

FLASH DEVICE → CAMERA BODY

| | SERIAL DATA (SH) | | | | | | | | |
|---|---|---|---|---|---|---|---|---|---|
| | b7 | b6 | b5 | b4 | b3 | b2 | b1 | b0 | |
| CORRECTION DEGREE SETTING POSSIBLE | — | — | — | — | — | — | — | 1 | |
| CORRECTION DEGREE SETTING IMPOSSIBLE | — | — | — | — | — | — | — | 0 | |
| CORRECTION DEGREE S | 1 | 1 | 1 | 0 | 1 | 0 | 0 | — | −3 |
| | 1 | 1 | 1 | 0 | 1 | 0 | 0 | — | −2 |
| | 0 | 0 | 1 | 1 | 1 | 0 | 0 | — | −1 |
| | 0 | 0 | 0 | 0 | 0 | 0 | 0 | — | 0 |
| | 0 | 0 | 0 | 1 | 0 | 0 | 0 | — | 1 |
| | 0 | 0 | 1 | 0 | 0 | 0 | 0 | — | 2 |
| | 0 | 0 | 1 | 1 | 0 | 0 | 0 | — | 3 |
| ERROR | 1 | 1 | 1 | 1 | 1 | 1 | 1 | 1 | |

FIG. 26(a)

CAMERA BODY → FLASH DEVICE

| INTERCHANGEABLE COMMUNICATION REQUEST (DR) | | | | | | | | |
|---|---|---|---|---|---|---|---|---|
| b7 | b6 | b5 | b4 | b3 | b2 | b1 | b0 |
| 0 | 0 | 0 | 0 | 0 | 0 | 0 | 1 |

| | SERIAL DATA (CC) | | | | | | | |
|---|---|---|---|---|---|---|---|---|
| | b7 | b6 | b5 | b4 | b3 | b2 | b1 | b0 |
| FLASH CONTROL LEVEL VARIABLE | 1 | — | — | — | — | — | — | 1 |
| FLASH CONTROL LEVEL FIXED | 1 | — | — | — | — | — | — | 0 |

FIG. 26(b)

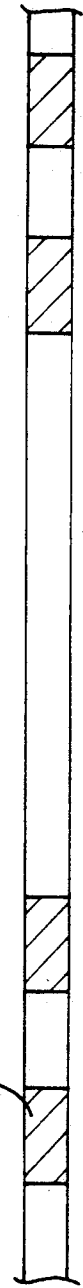
FIG. 27(a)
FIG. 27(b)
FIG. 27(c)
(SERIAL COMMUNICATION TIMING)

(INTERCHANGEABILITY COMBINATION)

| FLASH DEVICE<br>CAMERA BODY | CORRECTION DEGREE SETTING MEANS (YES) | CORRECTION DEGREE SETTING MEANS (NO) |
|---|---|---|
| FLASH CONTROL LEVEL VARYING MEANS (YES) | I | II |
| FLASH CONTROL LEVEL VARYING MEANS (NO) | III | IV |

FIG.28

FLASH PHOTOGRAPHING SYSTEM

This is a continuation application under 37 CFR 1.62 of prior application Ser. No. 503,217, filed Apr. 2, 1990 now abandoned, which is a continuation of application Ser. No. 397,711, filed Aug. 23, 1989, now abandoned.

BACKGROUND OF THE INVENTION

1. Field of the Invention

This invention relates to an improvement on a system comprising a camera which is arranged to measure and integrate an incident flash light coming through a photo-taking lens either directly or through a reflection light thereof, that is, to be capable of performing the so-called TTL flash control action, and a flash device which is arranged to be mounted on the camera.

2. Description of the Related Art

The conventional TTL flash control method has been as follows: for example, a light measuring sensor disposed within a camera body is arranged to capture the reflection on the surface of a film or a shutter curtain of flash light of a flash device coming through a photo-taking lens of the camera. The reflection light is integrated and checked for a given quantity of light. Upon detection of attainment of the given quantity of integrated light, a flash stopping signal is sent out from the camera body to the flash device. The signal causes the flashing action of the flash device to be brought to a stop by means of a commutation circuit or the like.

The above-stated given quantity of light is determined by an unconditional computing operation on the sensitivity of a film in use, an aperture value selected, a synchronizing shutter speed, etc. The method gives an excellent result for a certain object, such as a gray reflection plate of a reflection factor of 18% or the like. However, it often fails to have a white or black object photographed in a white or black color. Therefore, for a reversal film which is difficult to do corrective printing, the method has been hardly satisfactory.

It has been another shortcoming of the conventional method that an intrinsic automatic operating function of the flash device cannot be utilized when the photographer manually allows the flash device to flash by manually selecting an aperture value.

To solve these problems, a system has been proposed, as disclosed in Japanese Laid-Open Patent Application No. SHO 61-156238. The system is arranged to preliminarily allow the flash device to flash; to measure the light within the camera body; to allow the TTL flash control to perform after the result of the preliminary light measurement is corrected by the photographer as desired. However, this system necessitates many steps of operation and, therefore, is not suitable for continuous photographing. Besides, the cost of it increases because of many additional circuit required.

In a conceivable method for eliminating the above-stated shortcomings, a correction value indicating a variable degree of flash control level is set independently of an exposure level determined according to the normal light. That method enables the intention of the photographer to be reflected on the result of control. However, the method has the following shortcomings:

It complicates the operation on the camera for the photographer who does not require such a correction value. If the photographer does not understand the meaning of flash control correction, it might incur a failure. Besides, if the correction setting member is arranged to be easily movable, a correction value might be accidentally set without the photographer's knowledge, for example, while the camera is carried. Further, a photographing operation might inadvertently be performed with the camera system left at a previously set correction value when the correction value must be reset.

Further, with a flash device arranged to permit the above-stated correction value to be set thereon, the camera system should be arranged to have information on the set correction value transmitted from the flash device to the camera body and to allow a control circuit on the side of the camera body to control the quantity of light accordingly. In this instance, however, if the camera on which the flash device is to be mounted is not provided with this control circuit, the light quantity control cannot be accomplished according to the flash control correction value set on the side of the flash device. The photographer might be confused on that occasion.

SUMMARY OF THE INVENTION

It is one aspect of this invention to provide a camera system, wherein, when a flash device which is arranged to permit the above-stated correction value to be set thereon is mounted on a camera which is arranged to be capable of adjusting the quantity of light on the basis of the correction value, if the exposure mode of the camera is set in a special mode requiring no correction, the special mode is displayed either on the flash device or on a display device of the camera, so that the photographer can be informed that no flash control correction will be performed.

It is another aspect of the invention to provide a camera system which is arranged to inform the photographer with a display that no corrective action will be performed when a flash device which permits the above-stated correction value to be set thereon is mounted on a camera which is incapable of adjusting the quantity of light on the basis of the correction value set.

The above and other objects and features of the invention will become apparent from the following detailed description of embodiments taken in conjunction with the accompanying drawings.

BRIEF DESCRIPTION OF THE DRAWINGS

FIGS. 24, 25(a) and 25(b) are flow charts showing other programs of the microcomputer 2.

FIGS. 26(a) and 26(b) shows the format of communication between the camera body and the flash device of FIG. 11.

FIGS. 27(a), 27(b) and 27(c) are charts showing communication timing.

FIG. 28 shows combination examples of cameras and flash devices of different kinds.

DETAILED DESCRIPTION OF THE PREFERRED EMBODIMENTS

Figure 1:
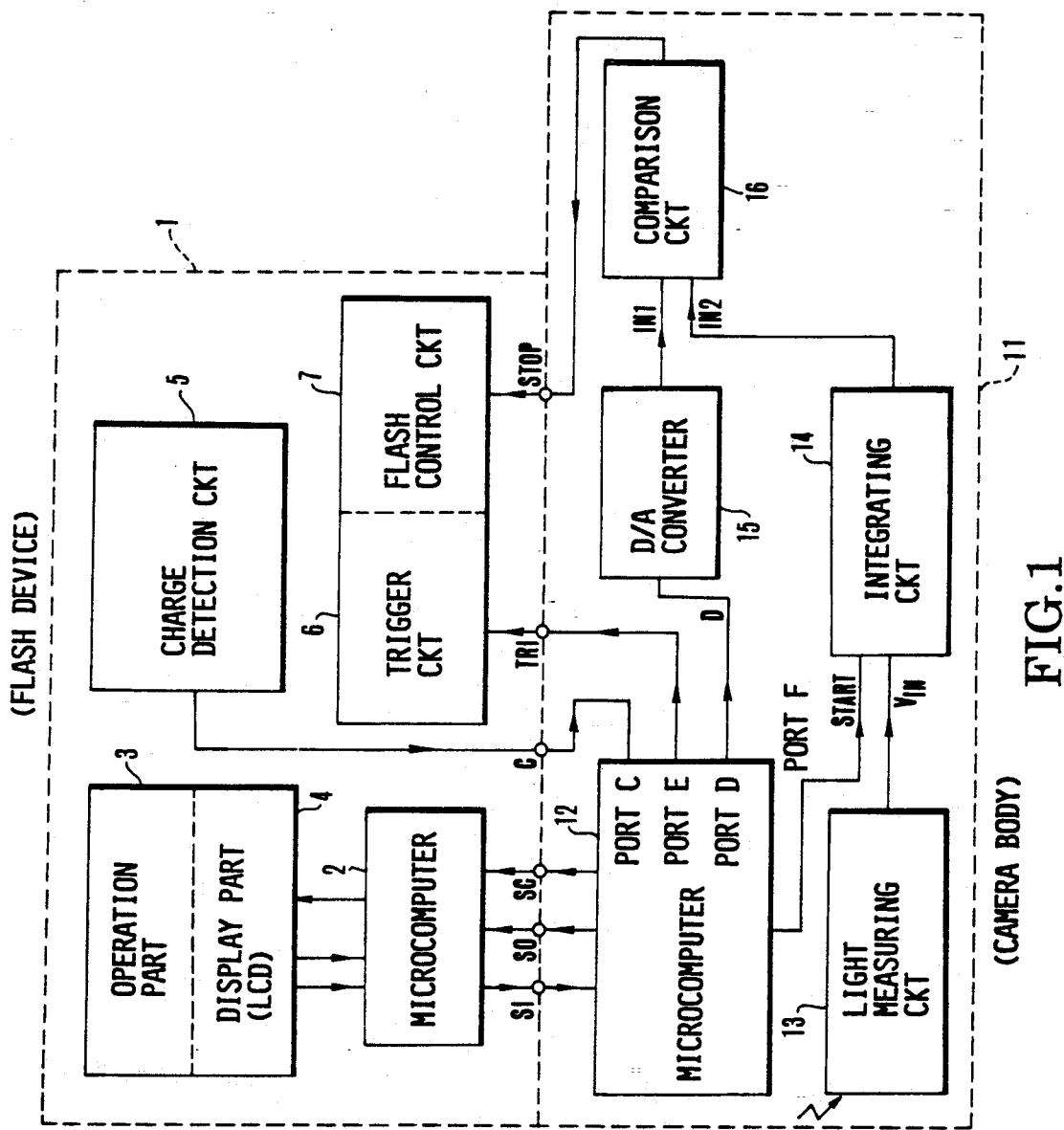
FIG. 1 is a circuit diagram showing a flash device and a camera body which are arranged according to this invention as an embodiment thereof.

FIG. 1 shows an embodiment of this invention in a block diagram. Referring to FIG. 1, a flash device 1 includes a microcomputer 2; an operation part 3; a display device 4; a charge detection circuit 5; a trigger circuit 6; and a flash control circuit 7. A camera body 11 includes a microcomputer 12; a light measuring circuit 13; an integrating circuit 14; a D/A converter 15; and a comparison circuit 16. The flash device 1 and the camera body 11 communicate with each other via communication ports SI, SO, SC, C, TRI and STOP.

Each of the microcomputers 2 and 12 is a general purpose one-chip microcomputer. They are arranged to perform serial communication between them.

Figure 2:
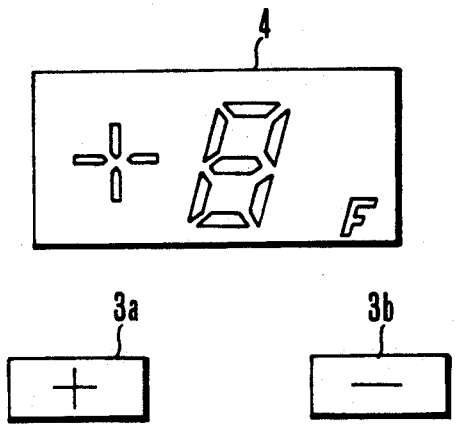
FIG. 2 shows by way of example the arrangement of an operation part 3 and a display part 4 shown in FIG. 1.

The trigger circuit 6 and the flash control circuit 7 are the same as those employed in the conventional flash device. The charge detection circuit 5 is arranged to monitor the voltage of the main capacitor disposed in the flash device 1 and to supply a charging completion signal to the camera body 11 via the communication port C when the voltage comes to exceed a given voltage which enables a xenon discharge lamp to flash. The operation part 3 consists of two keys 3a and 3b as shown in FIG. 2 and is arranged to permit control over the degree of correction. The display part 4 is composed of, for example, an LCD. For example, a display "+1F" means that the flash control degree is increased to an excessive degree by one step.

The above-stated light measuring circuit 13 includes a sensor for which an SPD is employed. Flash light emitted from the flash device 1 comes through a lens to be reflected on a film surface. Then a reflection light thus obtained is received by the SPD. The instant a start signal is supplied, the integrating circuit 14 begins to integrate a voltage coming from the light measuring circuit 13. The comparison circuit 16 is arranged to compare signal voltages IN1 and IN2. The comparison circuit 16 supplies to the flash control circuit 7 via the communication port STOP a low level signal if the voltage IN1 is higher than the voltage IN2 and a high level signal if the voltage IN2 is higher than the voltage IN1. The D/A converter 15 is arranged to convert an input digital value D into the above-stated (analog) signal voltage IN1.

Figure 3:
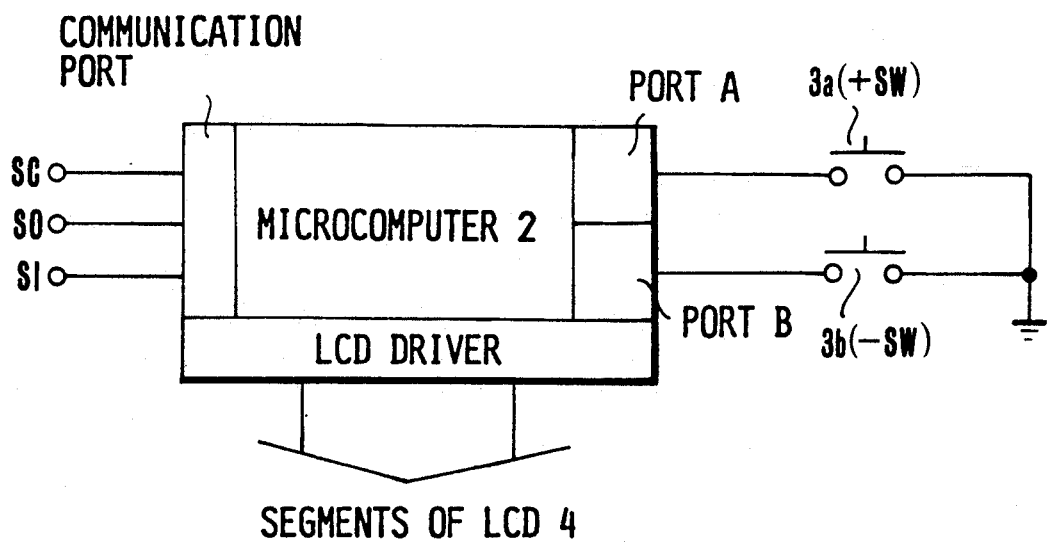
FIG. 3 is a circuit diagram showing the connection with peripheral circuits of a microcomputer 2 disposed within the flash device of FIG. 1.

The embodiment which is arranged as described above operates as follows: the keys 3b and 3c (hereinafter referred to as +SW and −SW) of the operation part 3 disposed on the flash device and the display part 4 (hereinafter referred to as LCD) are connected to the microcomputer 2 in a manner as shown in FIG. 3. The microcomputer 2 is provided with software which is as shown in FIG. 4.

Figure 4:
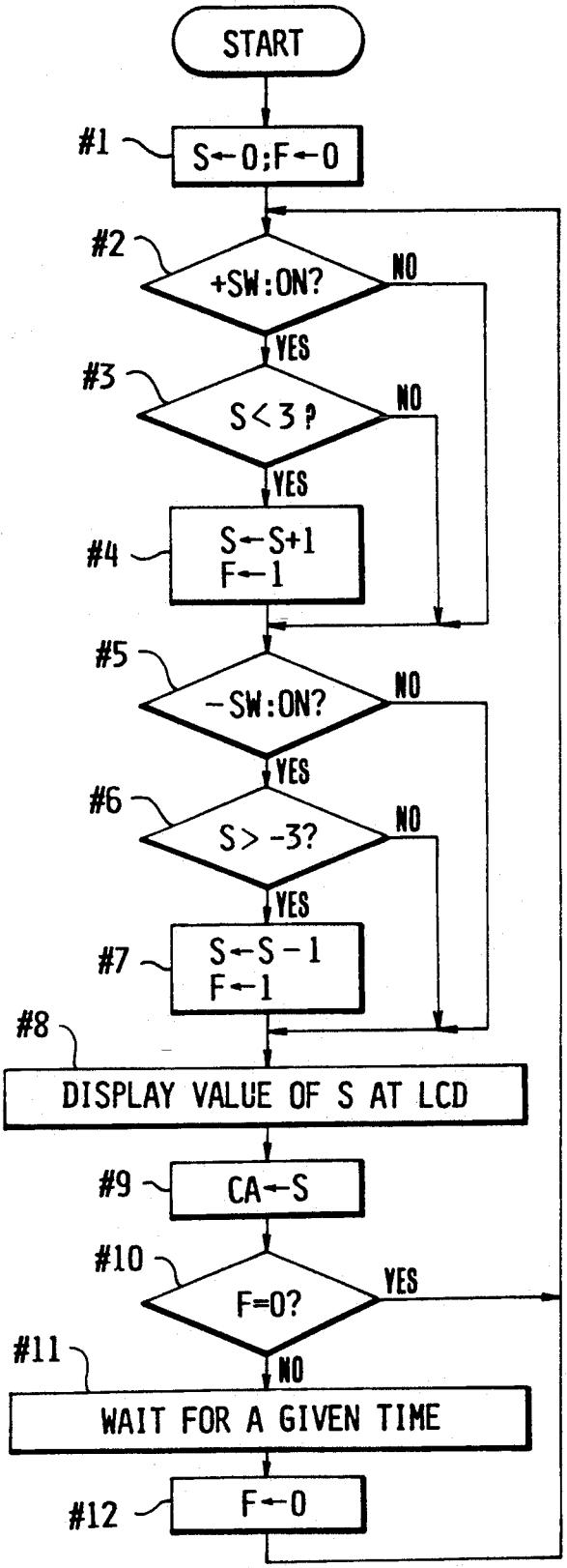
FIG. 4 is a program flow chart showing the operation of the microcomputer 2 of FIG. 1.

Referring to FIG. 4, the operation of the software is as follows: at a step #1, a correction value S and a flag F are set at an initial setting value of 0. Step #2: The content of a port A is read to find if the key +SW is pushed. If so, the flow of operation proceeds to a step #3. If not, the flow comes to a step #5. Step #3: A check is made to see if the correction value S is less than its upper limit value 3. If so, the flow proceeds to a step #4 to increment the correction value S by one and, at the same time, set the flag F at 1. If not, the flow comes to the step #5.

Step #5: The content of a port B is read to see if the key −SW is pushed. If so, the flow comes to a step #6. If not, the flow comes to a step #8. Step #6: A check is made to see if the correction value S is larger than its lower limit value −3. If so, the flow comes to a step #7 to decrement the correction value S by 1 and, at the same time, set the flag F at 1. If not, the flow comes to a step #8.

Step #8: The correction value S is displayed at the LCD 4. Step #9: The correction value S is transferred to a communication register CA. When a clock signal is received at a communication port SC, the value of the communication register CA is unconditionally sent out to a communication port SI. Further, the correction value S and the negative value of the communication register CA are arranged to be expressed by complements on two.

Step #10: A check is made to see if the flag is at 0. If so, the flow comes back to the step #2. If not, the flow proceeds to a step #11 to wait for a given period of time (400 msec) without doing anything. After the lapse of the given period, the flow comes to a step #12. Step #12: The flag F is set at 0 and the flow comes back to the step #2. This part of the flow is provided for the purpose of retarding changes when the key +SW or −SW is continuously pushed.

Figure 5:
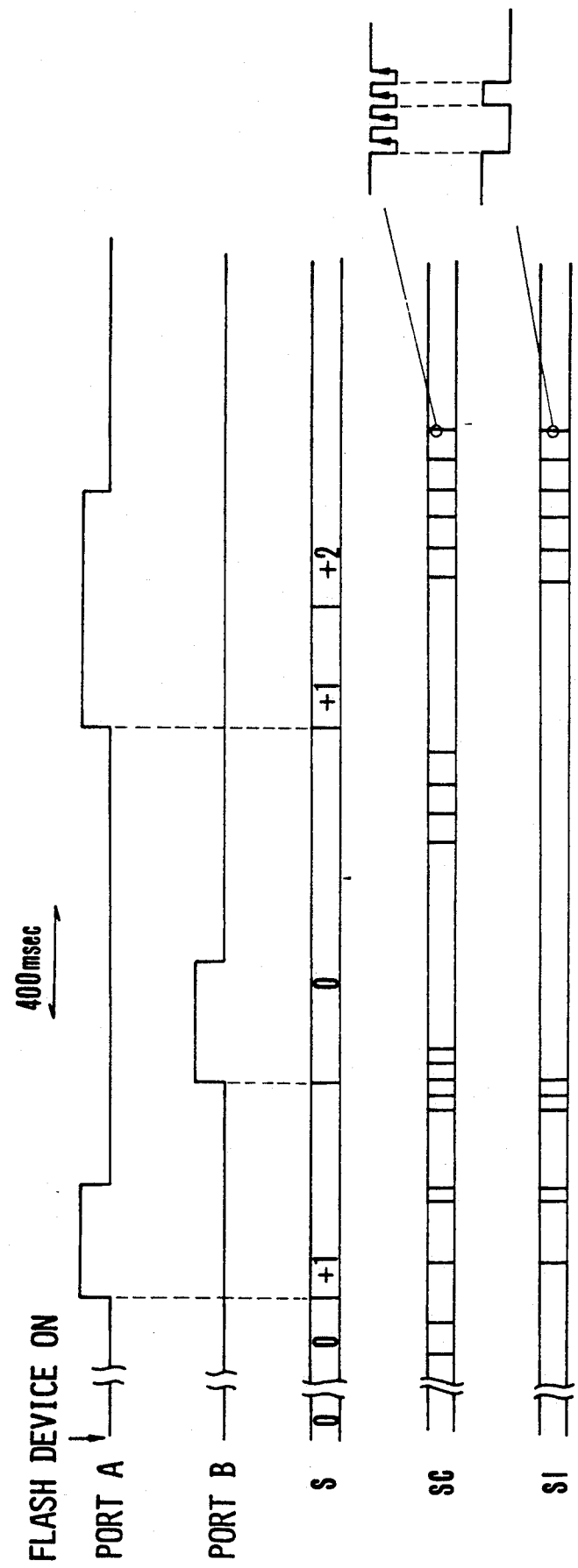
FIG. 5 shows serial communication between the flash device and the camera body of FIG. 1.
Figure 6A:
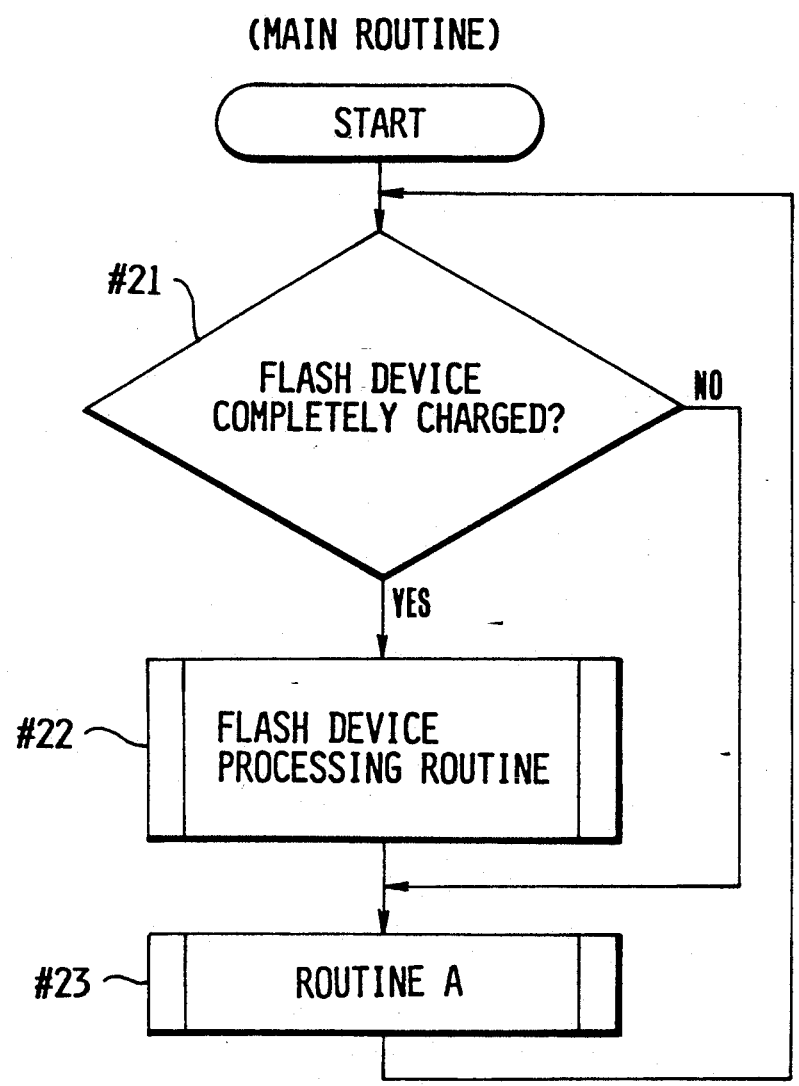
FIGS. 6(a), 6(b) and 6(c) are program flow charts showing the operation of a microcomputer 12 of FIG. 1.
Figure 6B:
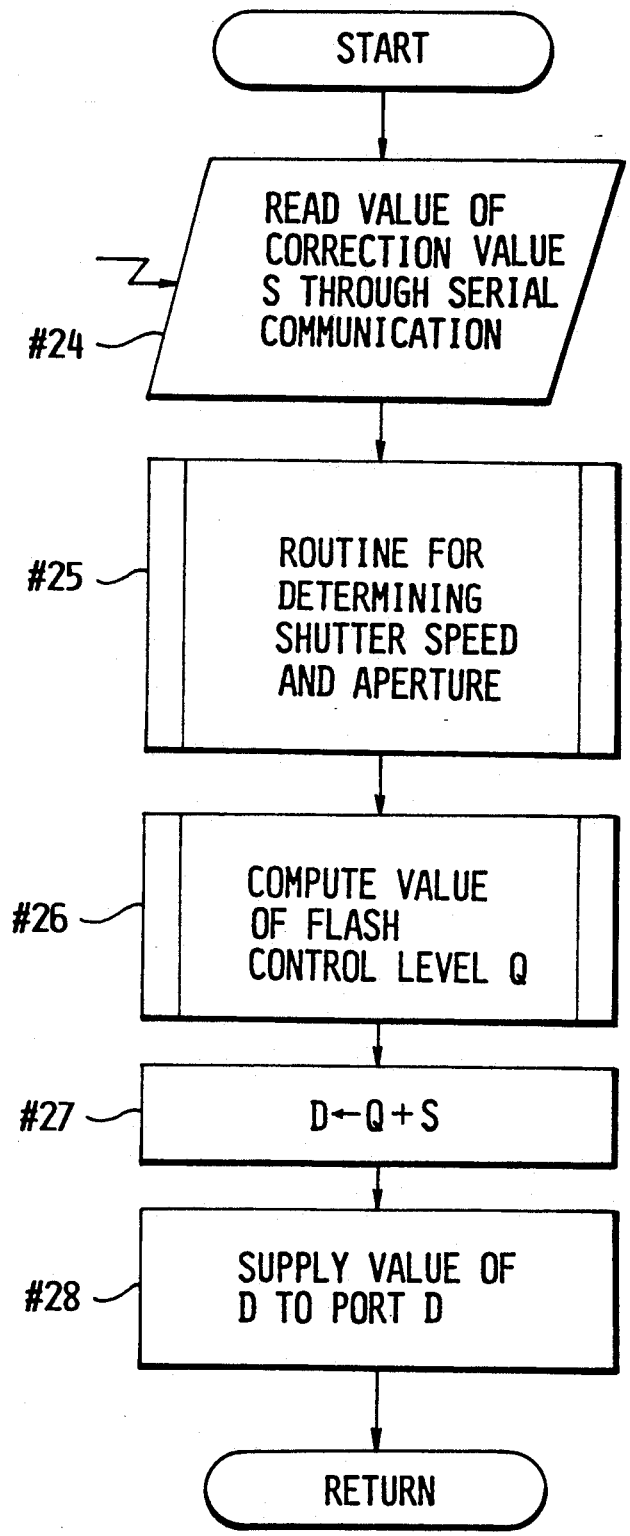
Figure 6C:
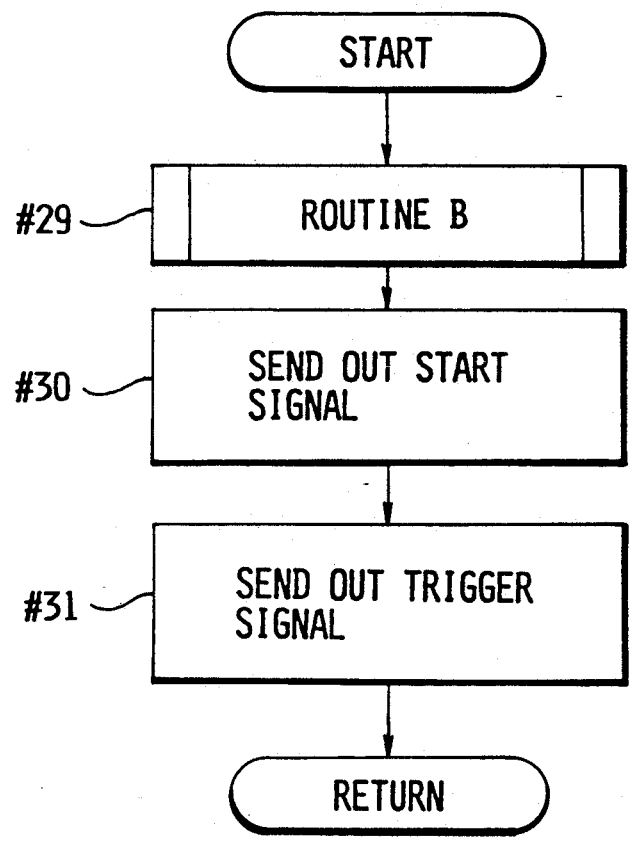
Figure 7:
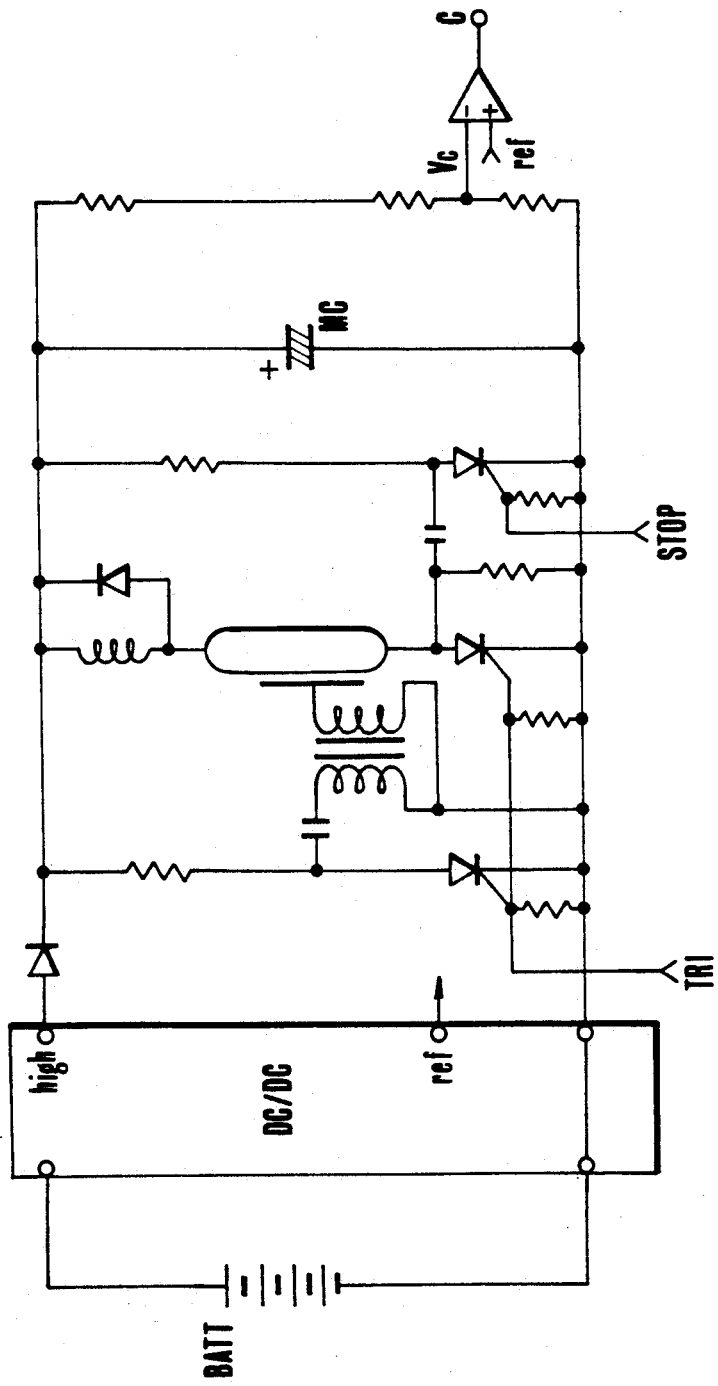
FIG. 7 is a circuit diagram showing the arrangement of a part of the flash device of FIG. 1.

Meanwhile, the microcomputer 12 which is disposed within the camera body 11 is also provided with software as shown in FIGS. 6(a) to 6(c). The microcomputer 12 is arranged to intermittently and repeatedly send out a clock signal at intervals of a given length of time to the flash device, via the communication port SC, and to read the correction value S which is coming via the communication port SI. These actions can be expressed in a timing chart as shown in FIG. 5.

Referring to FIG. 5, in response to the fall of the clock signal coming via the communication port SC, the flash device 1 sends out data to the camera body 11 via the communication port SI. The camera body 11 then reads the data in response to the rise of the clock signal coming via the communication port SI.

FIGS. 6(a) to 6(c) show the software written in the microcomputer 12 which is disposed within the camera body 11. Among these figures, FIG. 6(a) shows the main routine of the software. For the sake of simplification of description of the operation, the following description is limited to the operation to be performed when the flash device is completely charged and the operation to be performed when the flash device is not completely charged is omitted from description as it is completely irrelative to this invention.

Step #21: If the flash device is completely charged, a voltage Vc which is obtained by dividing the voltage at the two ends of a main capacitor MC is higher than a reference voltage ref (=2.6 V) and a charging completion signal is supplied to a communication port C. Then, the microcomputer 12 receives this signal from the communication port C and proceeds to a step #22 to execute a flash device processing routine. This routine is as shown in FIG. 6(b). At a step #24 of FIG. 6(b), the correction value S is first detected through the serial communication (see FIG. 5) mentioned in the foregoing. The correction value S is assumed to be −1 here. The flow of operation of the microcomputer 12 proceeds to a step #25.

Step #25: An aperture value and a shutter speed are determined in a manner which is the same as in the conventional AE light measuring system. Step #26: After the aperture and shutter speed values are determined at the step #25, the value of the flash control level Q of the flash device is computed on the basis of the values determined together with a film sensitivity value which has already been known. This computing operation can be performed also in the same manner as the conventional computing operation. Step #27: The flash control level Q and the correction value S are added together. The result of addition thus obtained is supplied to a register D. Step #28: A digital value D is produced from a port D. The D/A converter 15 then converts the digital value D into a signal voltage IN1 which is of an analog value.

Meanwhile, when a shutter release button is pushed, an interruption occurs and a process begins from a step #29 of a routine which is as shown in FIG. 6(c).

The routine of the step #29 is for preliminaries before an exposure action on the film surface, such as a shutter curtain opening process, a mirror uplifting process, etc., which are not directly related to this invention. With a series of these preliminaries performed, the flow proceeds to a step #30 immediately after completion of the travel of the leading curtain of the shutter. Step #30: A start signal is produced from a port F of the microcomputer 12 for initialization of the integration value of the integrating circuit 14. This causes the integrating circuit 14 to resume its integrating action (at a point of time t0 shown in FIG. 8). Then, the flow immediately comes to a step #31. Step #31: A trigger signal is produced from a port E via the communication port TRI. The trigger signal then causes the flash device to begin to flash, at a point of time t1 of FIG. 8.

Figure 8:
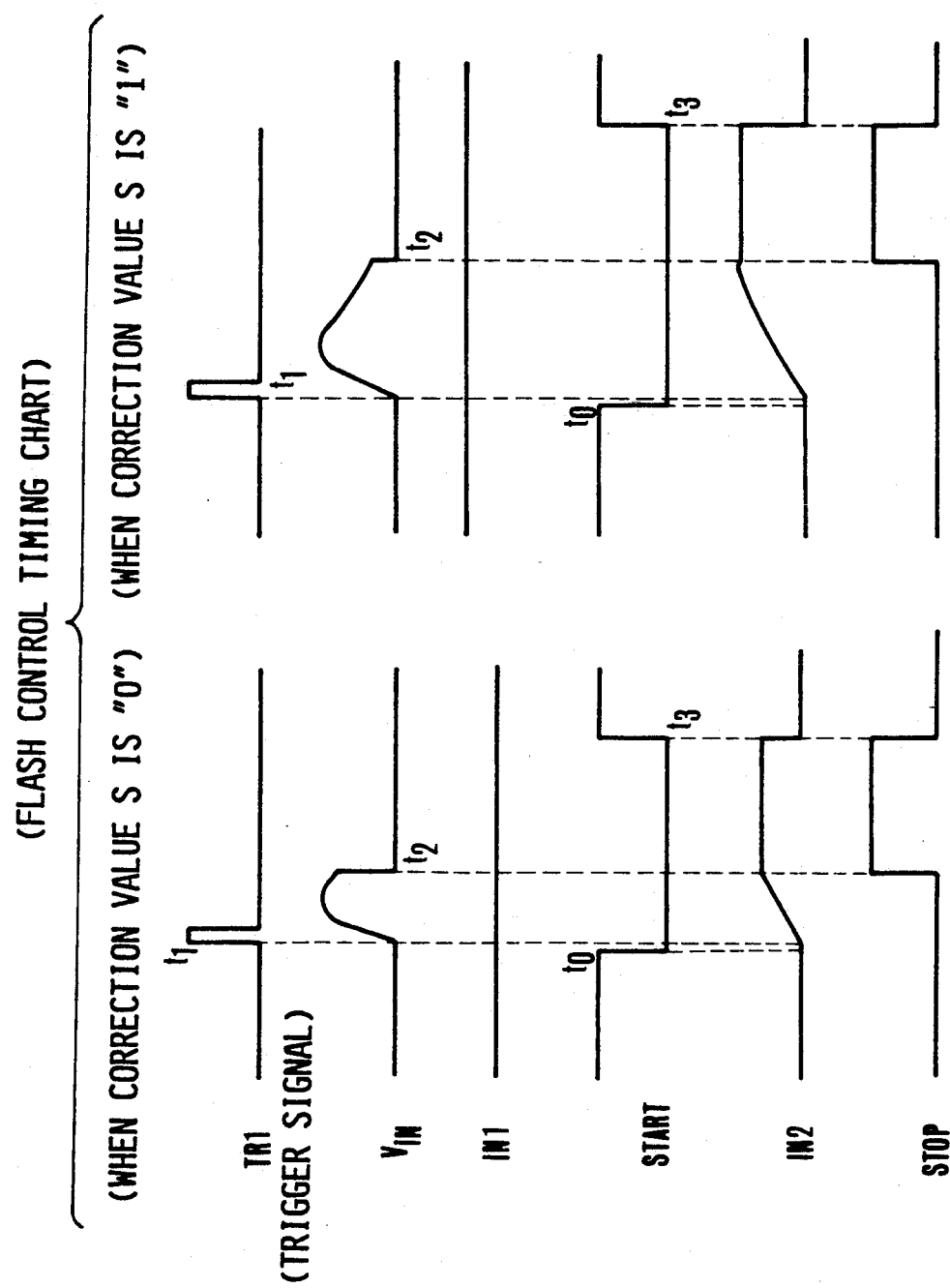
FIG. 8 is a wave form chart showing a flash control action on the flash device of FIG. 1.

A reflection mirror 101 which is disposed within the camera body 11 has been sprung up by then to allow the flash light from the flash device 1 to impinge upon the film surface 102 and to be received by the SPD 103 which is also disposed within the camera body 11. The SPD 103 then produces a voltage VIN (a measured light value), which is supplied to the integrating circuit 14. The circuit 14 begins to perform its integrating action. The comparator 16 compares input signal voltages IN1 and IN2. When the value of the voltage IN2 becomes larger than that of the voltage IN1, the comparator 16 produces a high level signal via the communication port STOP to the flash device 1. This high level signal informs the flash device 1 of completion of flash control, at a point of time t2 of FIG. 8. After that, the flow of operation of the microcomputer 12 comes to the step #23 of the main routine of FIG. 6(a) to reset the integration value, at a time point t3 of FIG. 8. The digital value D varies with the correction value S. Therefore, the signal voltage IN1 which is obtained by D/A conversion also varies with the correction value S. FIG. 8 shows the timing of these signals obtained both when the correction value S is 0 and when the value S is 1.

Figure 10A:
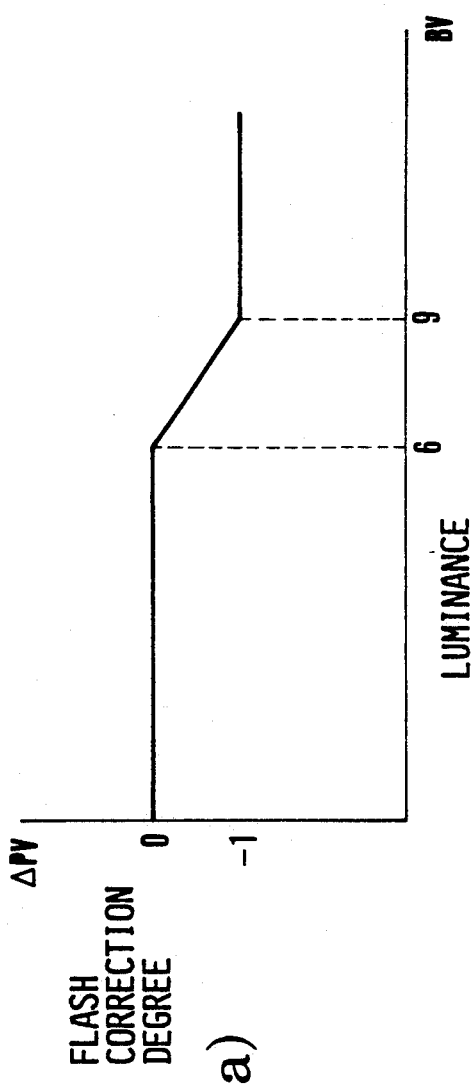
FIGS. 10(a) and 10(b) are wave form charts showing a light quantity correcting operation.
Figure 10B:
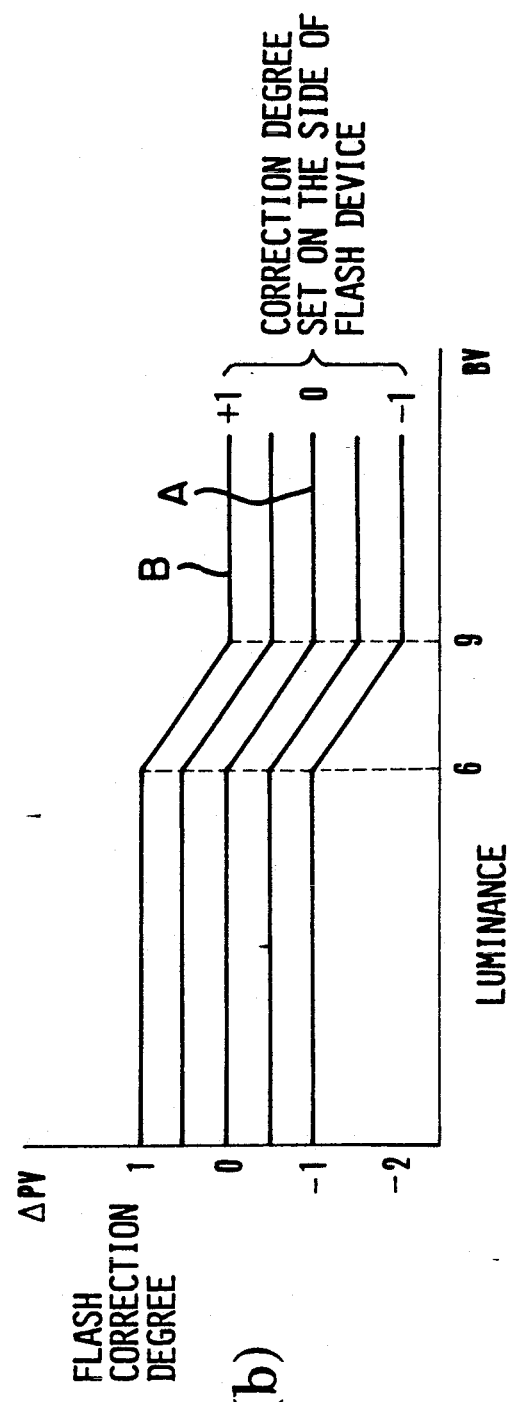

In computing the flash control level Q at the step #26 of FIG. 6(b), if a program mode such as an automatic exposure (AE) mode in which the camera automatically determines the aperture and shutter speed values has been selected by the photographer and if the flash device 1 is to be actuated (or allowed to flash) when a measured light value BV obtained by the SPD 103 of the light measuring circuit 13 disposed within the camera body 11 is above 6, a natural picture can be obtained, as known, by lessening the quantity of flash light, for example, as shown in FIG. 10(a). In the case of this embodiment, the flash control is arranged to be corrected by adding a manual correction degree obtained by a manual operation on the flash device to a flash correcting degree ΔPV obtained from the measured quantity of flash light as shown in FIG. 10(b). This enables the photographer to perform adequate flash control correction even in the case of fill-in flash photography with the camera set in the AE mode.

Figure 11:
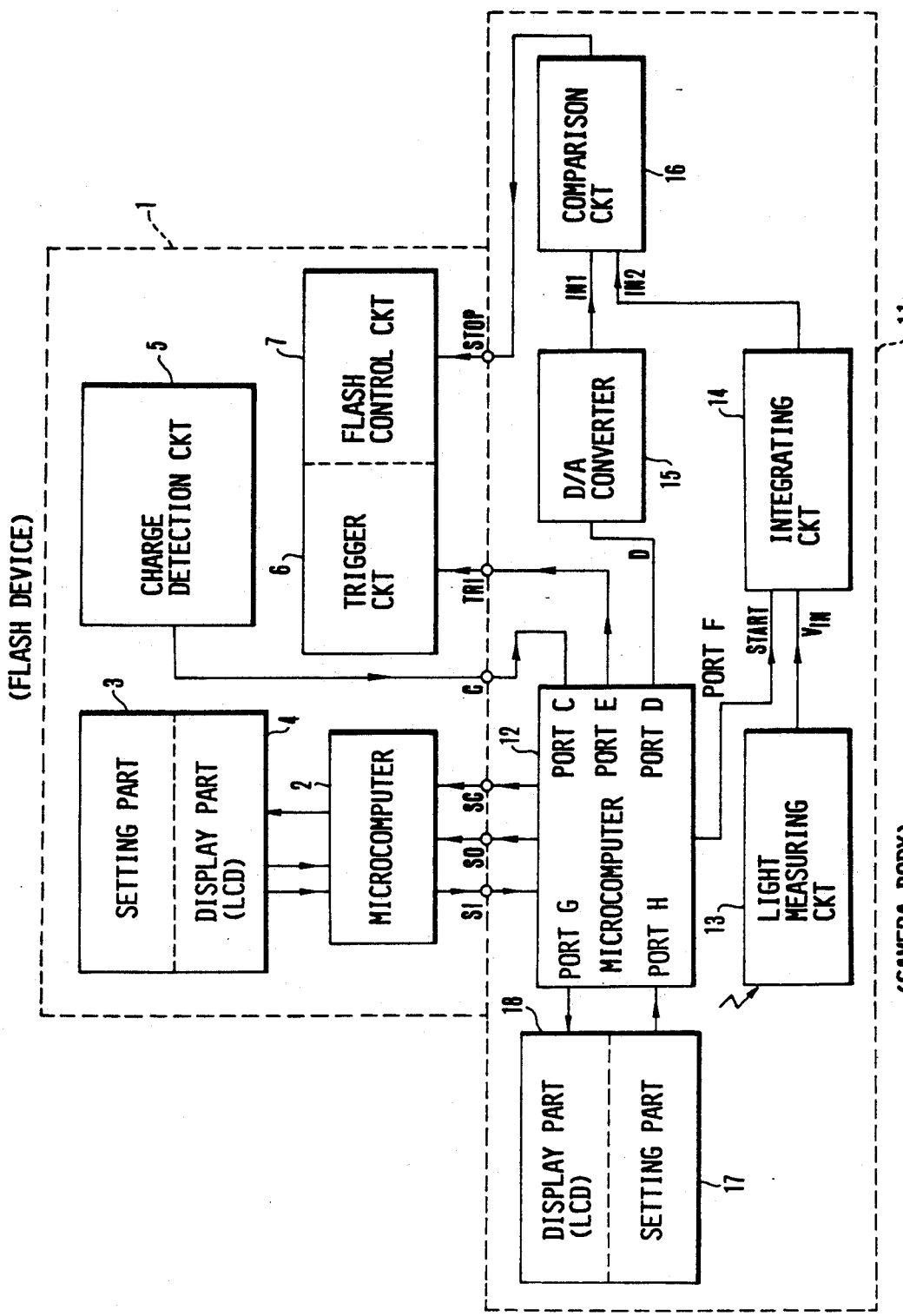
FIG. 11 is a circuit diagram showing another embodiment of the invention.

FIG. 11 is a block diagram showing another embodiment of this invention. Referring to FIG. 11, a flash device 1 includes a microcomputer 2, a setting part 3 which is provided for setting a correction value representing the variable degree of a flash control level; a display part 4 which is arranged to display the correction value; a charge detection circuit 5; a trigger circuit 6; and a flash control circuit 7. A camera body 11 includes a microcomputer 12; a light measuring circuit 13; an integrating circuit 14; a D/A converter 15; a comparison circuit 16; a setting part 17 which is provided for setting a photographing mode such as a full automatic mode; and a display part 18 which is arranged to display information on the photographing mode, etc., and is composed of, for example, an LCD. The flash device 1 and the camera body 11 are arranged to exchange signals through terminals SI, SO, SC, C, TRI and STOP.

The microcomputer 12 has a port C connected to the above-stated terminal C; a port E to the terminal TRI; a port D to the D/A converter 15; a port F to the integrating circuit 14; a port G to the display part 18; and a port H to the setting part 17 respectively.

The trigger circuit 6 and the flash control circuit 7 are arranged in the same manner as those of the conventional flash device. The charge detection circuit 5 is arranged to monitor the voltage of a main capacitor disposed within the flash device. The circuit 5 produces a charging completion signal and supplies it via the terminal C to the camera body 11 when the voltage of the main capacitor comes to exceed a given voltage which enables a xenon discharge lamp to flash.

The setting part 3 and the display part 4 are identical with the corresponding parts of the preceding embodiment which are shown in FIGS. 1, 2 and 3.

The light measuring circuit 13 includes a sensor which is composed of an SPD as will be further described later. The circuit 13 is arranged to perform an amplifying function. Light emitted from the flash device 1 comes through a lens to be reflected on a film surface. The reflection light thus obtained is received by the SPD.

The integrating circuit 14 begins to integrate a voltage VIN from the light measuring circuit 13 upon receipt of a signal START from the port F of the microcomputer 12. The voltage VIN is thus integrated into a voltage IN2. The comparison circuit 16 compares a voltage IN1 from the D/A converter 15 and the voltage IN2 from the integrating circuit 14 with each other. The comparison circuit 16 supplies, via the terminal STOP, the flash control circuit 7 of the flash device 1 with a low level signal if the voltage IN1 is higher than the voltage IN2 and with a high level signal as a timing signal for stopping the flash device 1 from flashing if the voltage IN2 is higher than the voltage IN1. The D/A converter 15 is arranged to convert an input digital value D into the above-stated voltage IN1 which is an analog voltage.

Figure 12:
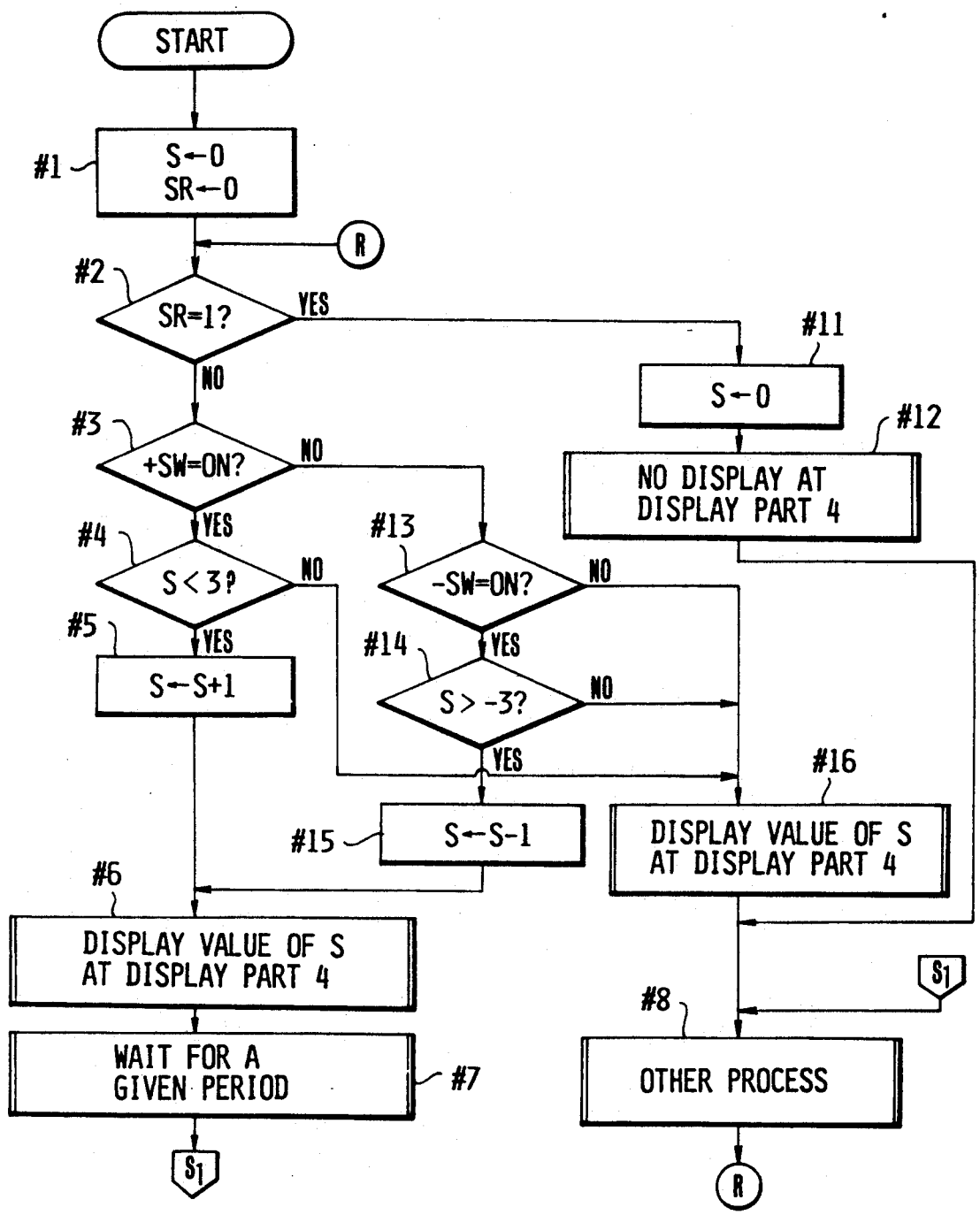
FIG. 12 is a program flow chart showing the operation of a microcomputer 2 of FIG. 11.

FIG. 12 is a flow chart showing a program which is provided for the microcomputer 2. Referring to FIG. 12 and also to FIG. 13 which is a time chart, the embodiment arranged as described above operates as follows:

At a step #1: The correction value S is initially set at 0 and a serial data register SR also at 0. Step #2: A check is made for the content of the data register SR previously received via the terminal SO from the camera body 11 through the serial communication in a manner as will be described later. Since the content of the data register SR is at 0 at that moment, the flow of operation comes to a step #3. (When the content of the data register SR is at 0, it indicates selection of some photographing mode other than a full automatic mode.)

Figure 14A:
FIGS. 14(a), 14(b) and 14(c) show the display actions of a display part 4.

Step #3: The content of the port A of the microcomputer 2 (see FIG. 3) is read to find if the key +SW has been pushed. If so, the flow comes to a step #4. If not, the flow comes to a step #13. In the initial stage of the operation, the key +SW has not been pushed as yet. In this instance, therefore, the flow branches out to the step #13: Step #13: The content of the port B of the microcomputer 2 (see FIG. 3) is read to find if the key −SW has been pushed. If so, the flow proceeds to a step #14. If not, the flow comes to a step #16. Since the key −SW has not been pushed in the initial stage, the flow in this instance branches out to the step #16. Step #16: The correction value S is displayed as "0" at the display part 4, as shown in FIG. 14(a). The flow then comes to a step #8. Step #8: Some process which is not directly related to this invention is carried out. After that, the flow again comes to the step #2.

Figure 13:
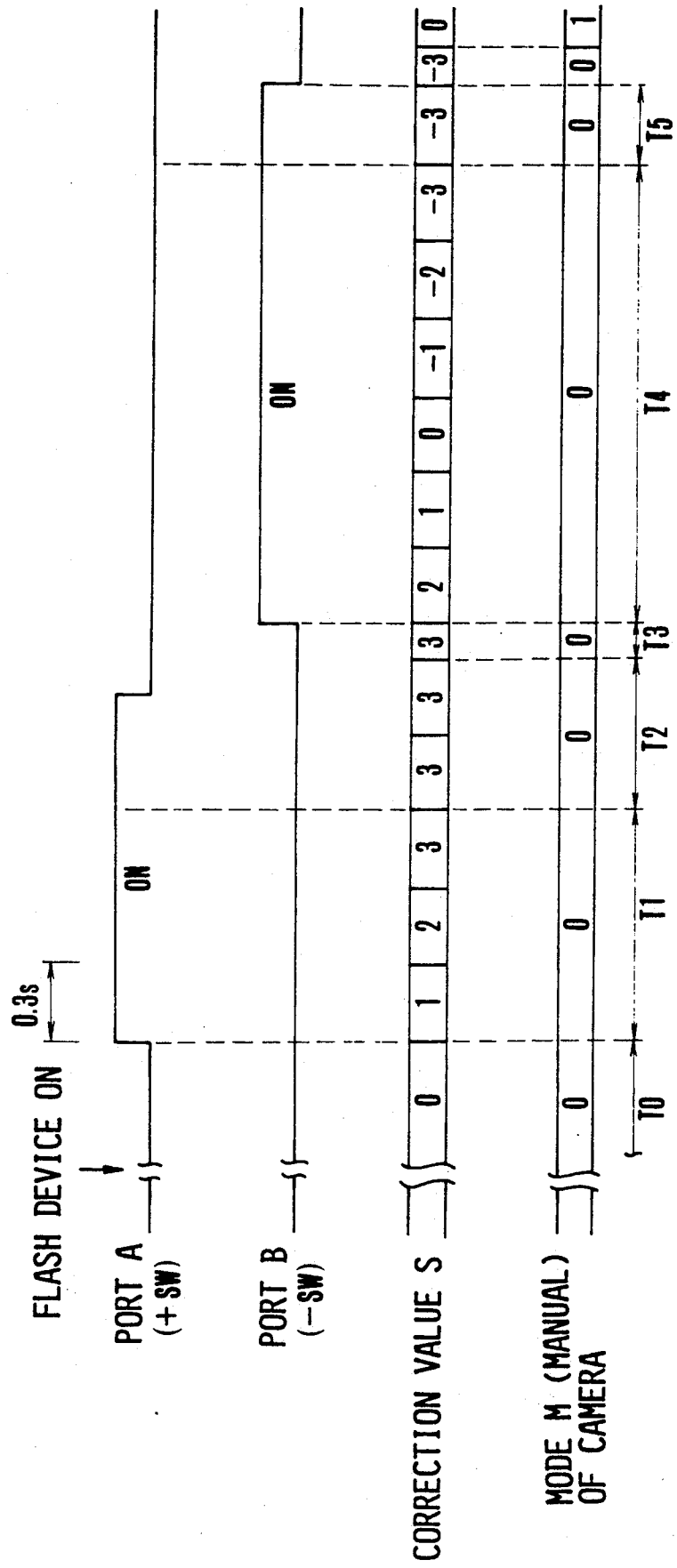
FIG. 13 is a wave form chart showing communication between a camera body and a flash device shown in FIG. 11.

The steps of this program are repeated in the above-stated manner, i.e., in the sequence of steps #2-#3-#13-#-16-#8-#2 as long as no key SW of the setting part 3 is operated and no communication is received from the camera body 11, i.e., during a period T0 as shown in FIG. 13.

Figure 14B:
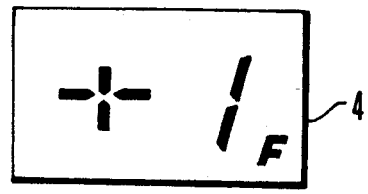

When the key +SW is operated at the setting part without any communication from the camera body 11, the flow of this program branches from the step #3 to a step #4. At the step #4: Since the correction value S is at 0 at that moment, the correction value is judged to be less than 3 and the flow branches off to a step S5. The value 3 is set to be the upper limit of the correction value S. Step #5: The value S is increased to "1" and the flow proceeds to a step #6. Step #6: The correction value S is displayed as "+1" at the display part 4 as shown in FIG. 14(b). The flow then comes to a step #7.

Step #7: The flow waits for a given period of time (0.3 sec). After that, the flow proceeds to a step #8 for a process which is not directly related to this invention. After the step #8, the flow comes back to the step #2.

As described above, if the key +SW of the setting part 3 is continuously operated, without any communication from the camera body 11, the steps of this program are repeated in the sequence of Steps #2-#3-#4-#5-#6-#7-#8-#2 as long as the correction value S remains below the upper limit value "3". Then, the correction value S varies in the order of 1, 2 and 3 (during a period T1 as shown in FIG. 13).

When the correction value S reaches 3 after the lapse of the period of time T1 as shown in FIG. 13, the value S is judged to be no longer less than 3 at the step #4. The flow then proceeds to the step #16. At the step #16: The correction value S is displayed as "+3" and the flow comes to the step #8 to carry out the process not directly related to this invention. After the step #8, the flow again comes to the step #2.

After this, the steps of the program are repeated in the sequence of steps #2-#3-#4-#16-#8-#2, during a period of time T2 as shown in FIG. 13, as long as the key +SW of the setting part 3 continues to be operated without receiving any communication from the camera body 11. During this period T2, the correction value S remains at "+3". After the lapse of this period T2, if the key SW of the setting part 3 is not operated at all while receiving no communication from the camera body 11, the correction value 3 still remains at 3, during a period of time T3 as shown in FIG. 13.

When the key −SW of the setting part 3 is operated after the lapse of the period T3, the flow of this program branches out from the step #3 to the step #13. At the step #13, the content of the port B of the microcomputer 2 is read out to see if the key −SW has been pushed. Since the key −SW is pushed this time, the flow proceeds to the step #14. Step #14: The correction value S is judged to be larger than −3 as it is at 3 at that moment and the flow comes to the step #15. The value −3 means the lower limit value of the correction value S.

Step #15: The value S is decreased to 2 and the flow comes to a step #6. Step #6: The value S is displayed as "+2" at the display part 4. The flow comes to a step #7. Step #7: The flow waits for a given period of time (0.3 sec) and, after that, comes to a step #8. After the process which is not directly related to this invention is carried out at the step #8, the flow again comes to the step #2.

With the key —SW of the setting part 3 thus continuously operated without receiving any communication from the camera body 11, the steps of this program are repeated, as long as the value S is larger than —3, in the sequence of steps #2-#3-#13-#14-#15-#6-#7-#8-#2. Meanwhile, the value S changes in the order of 2, 1, 0, —1, —2 and —3, during a period of time T4 as shown in FIG. 13. When the correction value S reaches —3 after the lapse of the period T4, the value S is judged to be no longer larger than —3 at the step #14. Then, the flow comes to the step #16.

Step #16: The correction value S is displayed as "—3" at the display part 4. The flow then comes to the step #8 to perform a process that is not directly related to the invention. After completion of the process, the flow again comes to the step #2.

After this, while the key —SW of the setting part 3 continues to be operated without any communication from the camera body 11, the steps of the program are repeated in the sequence of steps #2-#3-#13-#14-#16-#8-#2, during a period of time T5 as shown in FIG. 13. Meanwhile, the value S remains at —3. The display value at the display part 4 also remains at —3.

Figure 14C:
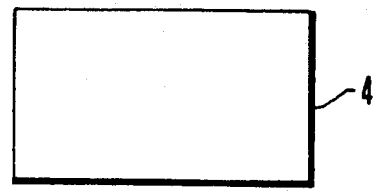

After the period T5, if the communication is received from the camera body 11 and the full automatic photographing mode is selected on the side of the camera body 11, the microcomputer 2 of the flash device 1 operates as follows: at the step #2: A check is made for the content of the data register SR which is last received via the terminal SO from the camera body through the serial communication. Since the content of the data register SR is "1" with the full automatic mode assumed to have been selected in this instance, the flow branches out to the step #11. The content "1" of the data register SR means that the full automatic mode is selected as the photographing mode of the camera. Step #11: A value "0" is substituted for the correction value S. The flow then proceeds to the step #12. Step #12: The display part 4 makes no display as shown in FIG. 14(c). This indicates that no flash control action will be performed. After that, the flow comes to the step #8 to perform a process which is not directly related to this invention. The flow then comes back to the step #2.

After the period T5, the program is executed by repeating the above-stated steps in the sequence of steps #2-#11-#12-#8-#2 as long as the camera body 11 continues to be in the state of having selected the full automatic mode with the flash device receiving communication from the camera body 11. Under this condition, the correction value S is inhibited from being set irrespectively of any operation on the key +SW or —SW.

Another microcomputer 12 which is disposed within the camera body 11 is also provided with a program. Roughly stated, the microcomputer 12 is arranged to intermittently and repeatedly send out a serial clock signal at intervals of a given length of time to the flash device 1 via the terminal SC and, at the same time, to receive serial data, i.e., the correction value S, from the flash device. The correction value data S is serially received via the terminal SI by a register SIR which is disposed within the microcomputer 12. The microcomputer 12 is further arranged to transmit a value data SD indicating the photographing mode of the camera via the terminal SO to the register SR which is disposed within the flash device 1.

Figure 15A:
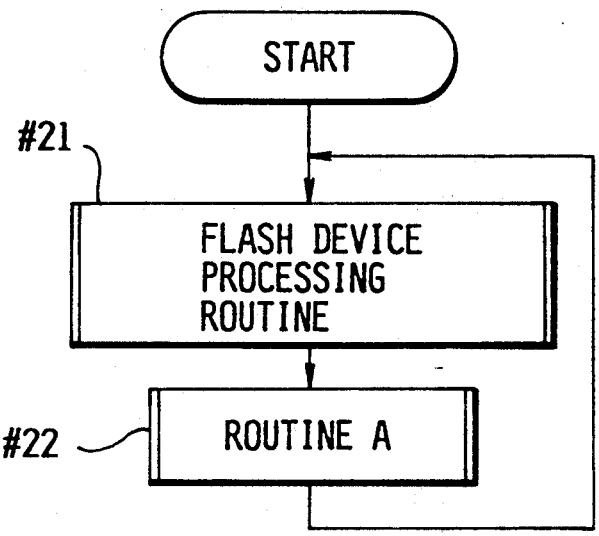
FIGS. 15(a), 15(b) and 15(c) are program flow charts showing the operation of a microcomputer 12 of FIG. 11.
Figure 15C:
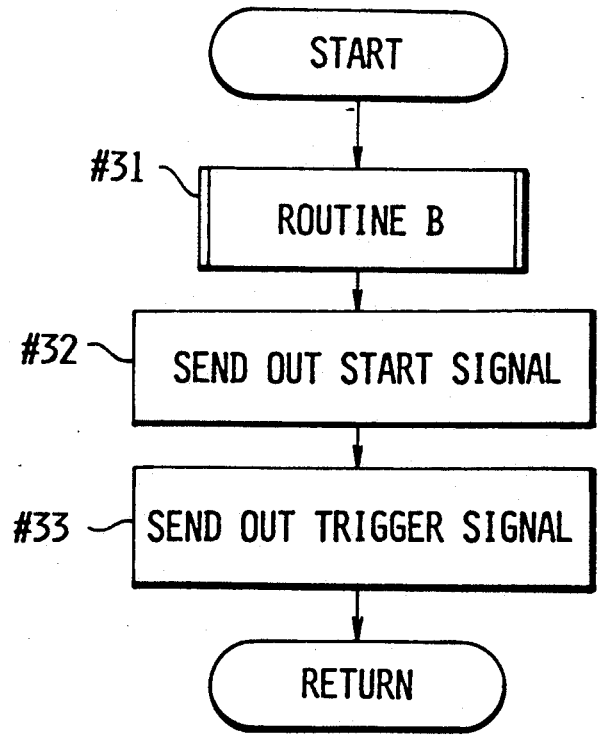
Figure 15B:
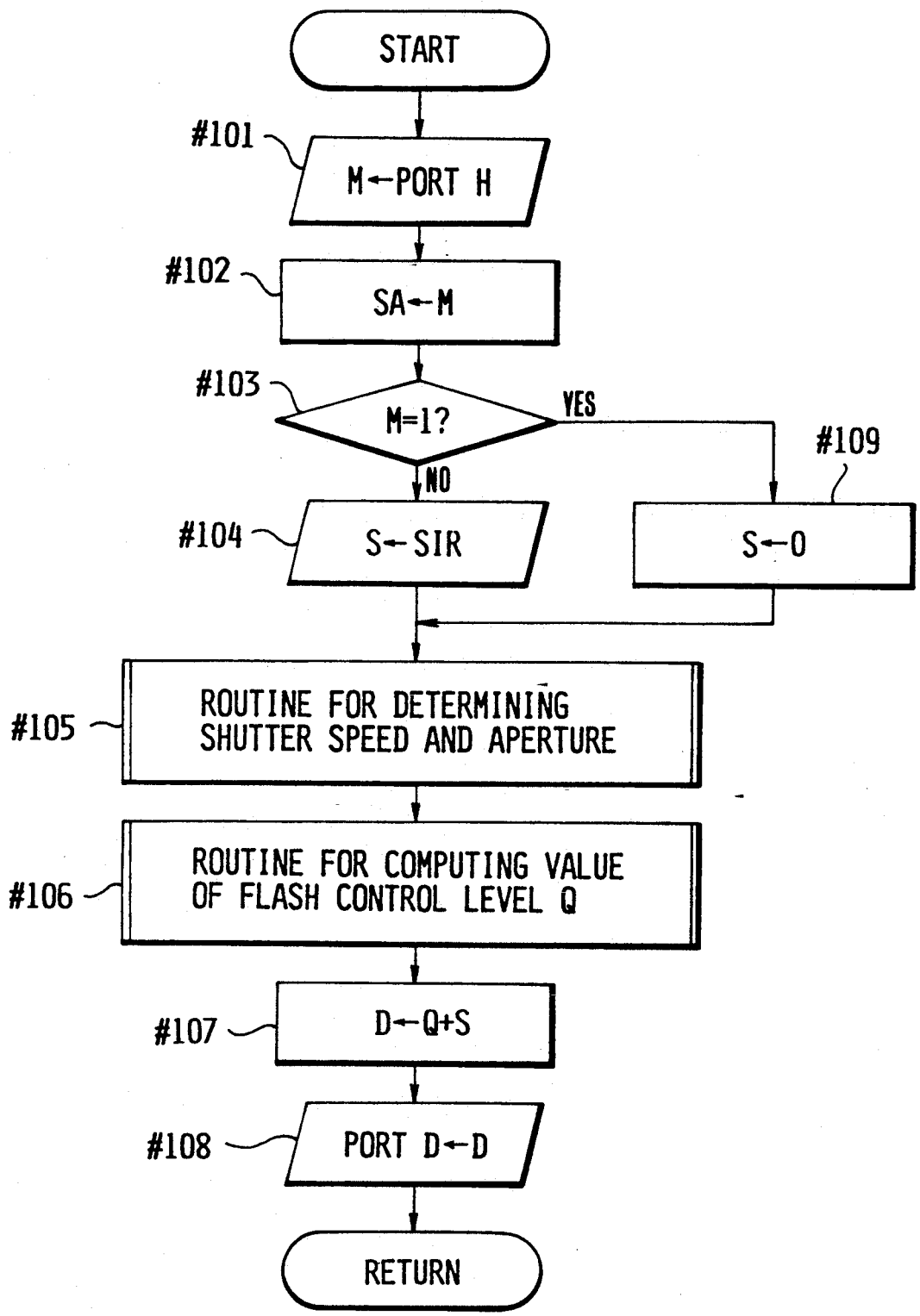

The programs of the microcomputer 12 are as shown in FIGS. 15(a) to 15(c). The operation of the microcomputer 12 is as described below with reference to these figures, wherein: FIG. 15(a) is a flow chart showing the main routine of the program. To make description more easily understandable, the operation of the microcomputer 12 to be performed with the flash device not completely charged is omitted from description.

Referring to FIG. 15(a), a flash device processing routine indicated at a step #21 is described in detail with reference to the flow chart of FIG. 15(b) as follows: Step #101: A set value M set at the setting part 17 is read from the port H and the flow proceeds to a step #102. Assuming that the camera is set in a mode which is other than the full automatic mode, the set value M is at "0".

Step #102: The value M is substituted for a serial data register SA. The flow proceeds to a step #103. The data (=0) of the register SA is transmitted at the next step of serial communication to the flash device 1 to be stored at the serial data register SR. Step #103: The value M is examined. Since the value M is at 0, the flow proceeds to a step #104. Step #208: The correction value S which has been set at the flash device 1 and received at the register SIR through the serial communication as mentioned above is read. In this instance the correction value S is assumed to have been set at —1. The flow proceeds to a step #105.

Step #105: The aperture and shutter speed values are determined. This process is not directly related to the invention and is performed in the same manner as the so-called automatic exposure control of the conventional camera. The details of the step #105 are therefore omitted from description. The flow then proceeds to a step #106. Step #106: A flash control level Q is determined on the basis of film sensitivity, the aperture value, etc. That process is also not directly related to this invention and, therefore, also does not require any detailed description. The flow proceeds to a step #107. Step #107: The flash control level Q and the correction value S are added together. A sum thus obtained is stored at a register D. The flow then proceeds to a step #108. Step #108: A digital value D is produced from the port D. The value D is then converted by the D/A converter 15 into the voltage IN1 which is an analog value. The flow then returns to the start to complete the flash device processing routine.

As long as the camera is allowed to remain in the mode which is other than the full automatic mode and is set at the setting part 17, this program is repeatedly executed in the sequence of steps #21-#101-#102-#103-#104-#105-#106-#107-#108-#21.

In case that the camera is set by the setting (operation) part 17 in the full automatic photographing mode, the microcomputer 12 of the camera body 11 operates as follows: At the step #101: The value M set by the setting part 17 is read from the port H. The flow proceeds to the step #102. Step #102: The value M is substituted for the serial data register SA. The flow proceeds to the step #103. The data of the register SA (=1) is transmitted to the register SR of the flash device 1 at a next step of the serial communication via the terminal SO. At the step #103: A check is made for the value M. Since the value M is at "1" in this case, the flow proceeds to the step #109. At the step #109, "0" is substituted for the variable S which represents the correction value. The flow then comes to the step #105. The step

105 and the steps subsequent to the step #105 are similar to the operation in the mode other than the full automatic mode as described in the foregoing and are, therefore, omitted from description.

As described above, with the full automatic mode selected by the setting part 17, this program is executed by repeating the sequence of steps #21-#101-#102-#103-#109-#105-#106-#107-#108-#21.

An interruption is allowed when a shutter release button is pushed. The release interruption routine begins from a step #31 of FIG. 15(c). Referring to FIG. 15(c), at the step #31, a routine B is executed. The routine B includes processes which are not directly related to this invention, such as a shutter curtain opening process, a mirror uplifting process, a process of beginning an exposure action on the film surface, etc. The details of the routine B are, therefore, omitted from description. After the step #31, the flow proceeds to a step #32.

Step #32: A signal START is produced from the port F of the microcomputer 12 for resetting the integration value of the integrating circuit 14 and for commencement of the integrating action of the circuit 14. The signal START causes the integrating circuit 14 to resume the integrating action, at the point of time t0 as shown in FIG. 8. After that, the flow immediately proceeds to a step #33. Step #33: A trigger signal is sent out from the port E via the terminal TRI. The trigger signal causes the flash device 1 to begin to flash at the point of time t1 as shown in FIG. 8.

Figure 9A:
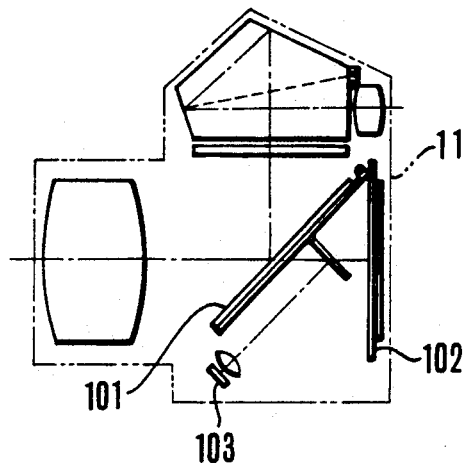
FIGS. 9(a) and 9(b) show the arrangement of the camera of FIG. 1.
Figure 9B:
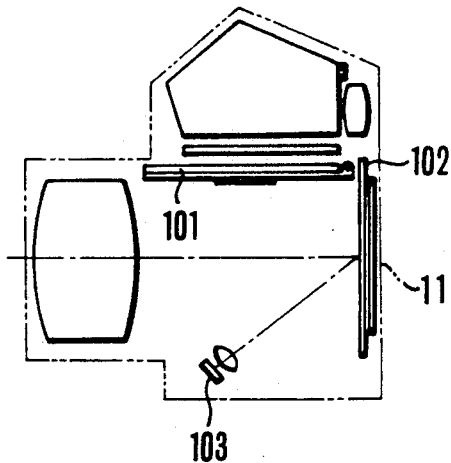

At that time, the reflection mirror 101 which is disposed within the camera body 11 has been uplifted as shown in FIGS. 9(a) and 9(b). This allows the flash light from the flash device 1 to impinge upon a film surface 102. A reflection light thus obtained is received by an SPD 103 which is included in the light measuring circuit 13. The SPD 103 produces a voltage (measured light value) VIN, which is sent to the integrating circuit 14. The circuit begins to perform its integrating action.

The comparison circuit 16 compares an input voltage IN2 which is produced from the integrating circuit 14 and another input voltage IN1 which is produced from the D/A converter 15. If the input voltage IN2 is higher than the input voltage IN1, the comparison circuit 16 sends out via the terminal STOP to the flash device 1 a high level signal as a timing signal for stopping the flash device 1 from flashing. This high level signal causes the flash device 1 to immediately stop from flashing at the point of time t2 as shown in FIG. 8. After that, the flow comes to the step #22 of the main routine shown in FIG. 15(a). Step #22: The integration value of the integrating circuit 14 is reset at the point of time t0 as shown in FIG. 8.

Further, in accordance with the invention, the flash control is not corrected by the above-stated setting value when the camera is in the full automatic mode. When the full automatic mode is selected, data "1" is produced from the setting part 17.

Figure 16A:
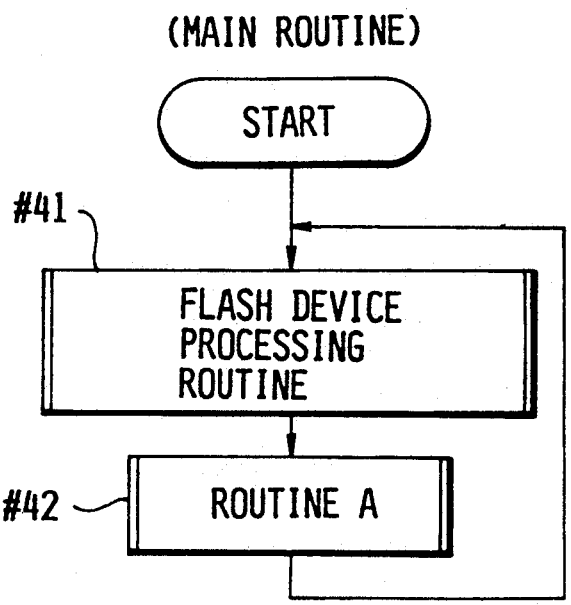
FIGS. 16(a), 16(b) and 16(c) are program flow charts showing other programs of the microcomputer 12.
Figure 16C:
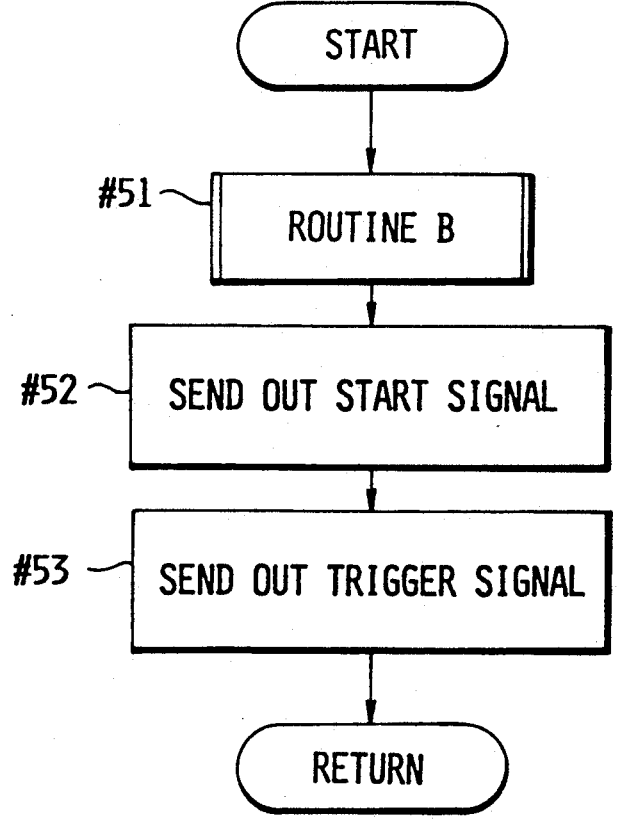
Figure 16B:
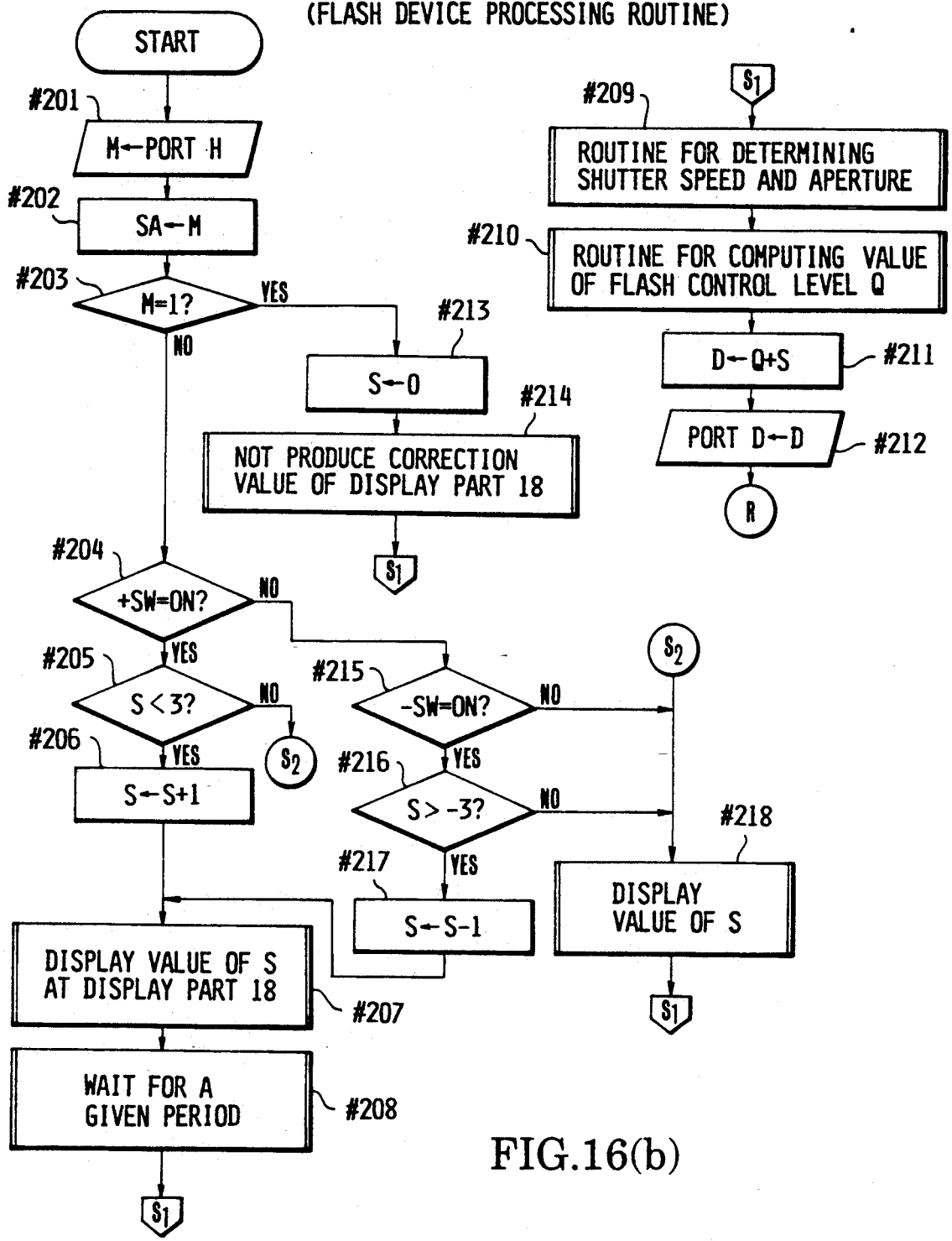

In the case of the embodiment shown in FIG. 11, the flash control correction value setting part is disposed on the side of the flash device. However, the same advantageous effect is attainable by setting the correction value setting part on the side of the camera body instead of on the side of the flash device. This modification is arranged as described below:

The arrangement of this modification is about the same as the arrangement shown in FIG. 11 except that the correction value setting operation and an action to display the set correction value are arranged to be performed at the setting part 17 and the display part 18 which are both disposed on the side of the camera body 11; and the program of the microcomputer 12 are changed from the programs of FIGS. 15(a), 15(b) and 15(c) to programs which are as shown in FIGS. 16(a), 16(b) and 16(c). The following description is, therefore, given with reference to FIG. 11 as well as FIGS. 16(a) and 16(b):

FIG. 16(a) shows the main routine of the above-stated program. The details of a flash device processing routine shown at a step #41 of FIG. 16(a) are as described below with reference to FIG. 16(b):

Step #201: A set value M which is set at the setting part 17 is read from the port H. The flow then proceeds to a step #202. In this initial stage of operation, the value M is at "0". Step #202: The value M is substituted for the data of the serial data register SA. The data "0" of the register SA is transmitted via the terminal SO to the flash device 1 at a next step of the serial communication. Step #203: A check is made for the value M. Since the value M is at "0" at this moment, the flow proceeds to a step #204.

Step #204: The content of the port H is read to find if the key +SW has been pushed. If so, the flow proceeds to a step #205. If not, the flow comes to a step #215. Since the key +SW has not been pushed in this initial stage, the flow comes to the step #215. Step #215: The content of the port H is read to find if the other key −SW has been pushed. If so, the flow comes to a step #216. If not, the flow comes to a step #218. Since the key −SW also has not been pushed as yet in this initial stage, the flow comes to a step #218.

Step #218: The correction value S is displayed as "0" at the display part 18. The flow comes to a step #209. At the step #209: Aperture and shutter speed values are determined. The flow then proceeds to a step #210. Step #210: A flash control level Q is determined on the basis of a film sensitivity value, the aperture value, etc. The flow then comes to a step #211. Step #211: The flash control level Q and the correction value S are added together. The result of addition is stored at the register D. The flow then comes to a step #212. Step #212: A digital value D is produced from the port D. The value D is supplied to the D/A converter 15 to be converted into an analog voltage value IN1. This routine comes to an end and the flow returns to the start.

Figure 17:
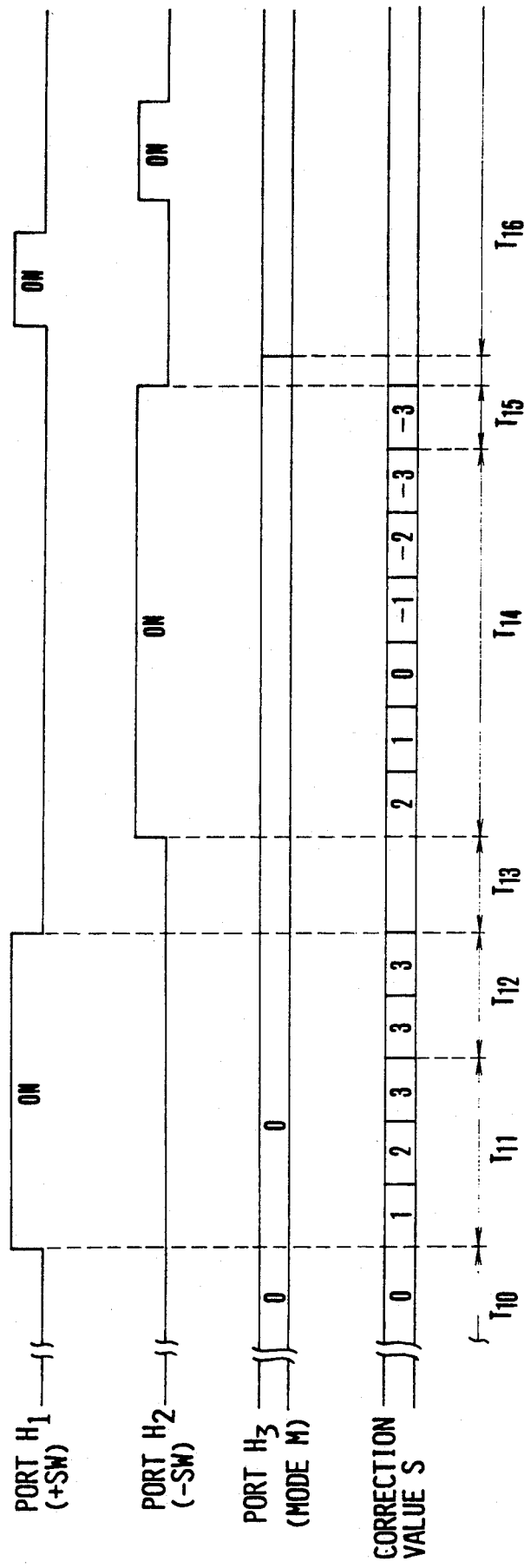
FIG. 17 is a wave form chart showing a correction value setting operation.

As described above, as long as the full automatic mode is not selected and no key SW is operated at the setting part 17, this program is repeated in the sequence of steps #201-#202-#203-#204-#215-#218-#209-#210-#211-#212, during a period of time T10 as shown in FIG. 17.

In case that the key +SW is operated at the setting part 17 while the full automatic mode is not selected, the flow of the program comes from the step #204 to a step #205. Step #205: Since the correction value S is at "0" at this moment, the value S is judged to be less than 3 which is the upper limit of the correction value S. The flow then comes to a step #206.

Step #206: The correction value S is increased to "1". The flow proceeds to a step #207. Step #207: The correction value S is displayed as "1" by the display part 18. The flow proceeds to a step #208. Step #208: The flow waits for a given period of time (0.3 sec). After that, the flow proceeds to the step #209. The step

209 and ensuing steps are executed in the same manner as described in the foregoing.

As described above, as long as the correction value S is less than 3 with the key SW continuously operated at the setting part 17 while the full automatic mode is not selected, the program is repeatedly executed in the sequence of steps #201-#202-#203-#204-#205-#206-#207-#208-#209-#210-#211-#212 during a period T11 as shown in FIG. 17.

When the correction value S reaches 3 after the lapse of the period T11, the value S is judged to be no longer less than 3 and the flow comes to the step #218. Step #218: The correction value S is displayed as "3" at the display part 18. The flow comes to the step #209. The steps from #209 through #212 are executed in the same manner as described in the foregoing.

As described above, as long as the key +SW is continuously operated at the setting part 17 without selecting the full automatic mode, the program is repeated in the sequence of steps #201-#202-#203-#204-#205-#218-#209-#210-#211-#212. During this period, the correction value S remains unchanged from 3 and the display also remains at "+3" during a period of time T12 as shown in FIG. 17. After the lapse of the period T12, if neither the key +SW nor the key —SW is operated at the setting part 17 while the camera remains in the mode other than the full automatic mode, the correction value S remains unchanged while the program is repeated in the sequence of steps #201-#202-#203-#204-#215-#218-#209-#210-#211-#212, during a period of time T13 as shown in FIG. 17.

After the lapse of the period T13, when the key —SW is operated, the flow of this program comes from the step #215 to the step #216. Step #216: Since the correction value S is at 3 at that moment, the value S is judged to be larger than —3, which is the lower limit of the correction value S. The flow then comes to the step #217. Step #217: The value S is decreased to 2. The flow then comes to the step #207. Step #207: The correction value S is displayed as "2" at the display part 18. The flow then proceeds to the step #208. At the step #208: The flow waits for a given period of time (0.3 sec). After that, the flow comes to the step #209.

The steps from #209 through #212 are executed in the same manner as the manner described in the foregoing.

As described in the foregoing, as long as the correction value S is larger than —3 with the key —SW continuously operated at the setting part 17 without selection of the full automatic mode, the program is repeatedly executed in the sequence of steps #201-#202-#203-#204-#215-#216-#217-#207-#208-#209-#210-#211-#212. Meanwhile, the correction value S varies in the order of 2, 1, 0, —1, —2 and —3, during a period of time T14 as shown in FIG. 17.

When the correction value S reaches —3 after the lapse of the period T14, the value S is judged to be no longer larger than —3 at the step #216. The flow then comes to the step #218. At the step #218: The display part 18 displays the correction value S as —3. The flow then proceeds to the step #209. The steps #209 to #212 are executed in the same manner as the manner described in the foregoing.

As described above, as long as the key —SW is continuously operated without selection of the full automatic mode at the setting part 17, the program is repeated in the sequence of steps #201-#202-#203-#215-#216-#218-#209-#210-#211-#212. Meanwhile, the value S remains unchanged from —3 and its display also remains at —3, during a period of time T15 as shown in FIG. 17.

If the full automatic mode is selected at the setting part 17 after the lapse of the period T15, the flow of the program of the microcomputer 12 is executed in the following manner: Step #201: The value M set at the setting (operation) part 17 is read from the port H. The flow proceeds to the step #202. The value M is at 1 in this instance. Step #202: The value M is substituted for the data of the serial data register SA. The flow comes to the step #203. The data "1" of the register SA is transmitted via the terminal SO to the flash device 1 at a next step of the serial communication.

Step #203: A check is made for the value M. Since the value M is at 1 in this instance, the flow comes to the step #213. Step #213: For the correction value S, "0" is substituted. The flow then comes to the step #214. At the step #214: The display part 18 makes no display thus indicating that no correcting action will be performed for flash control. After that, the flow comes to the step #209. The steps from #209 through #212 are executed in the same manner as the foregoing description. After the lapse of the period T14, the program is repeatedly executed in the sequence of steps #201-#202-#203-#213-#214-#209-#210-#211-#212 as long as the camera remains in the full automatic mode. Under this condition, the correction value S is inhibited from being set irrespective as to whether the key +SW or —SW is operated, during a period of time T16 as shown in FIG. 17.

Figure 18:
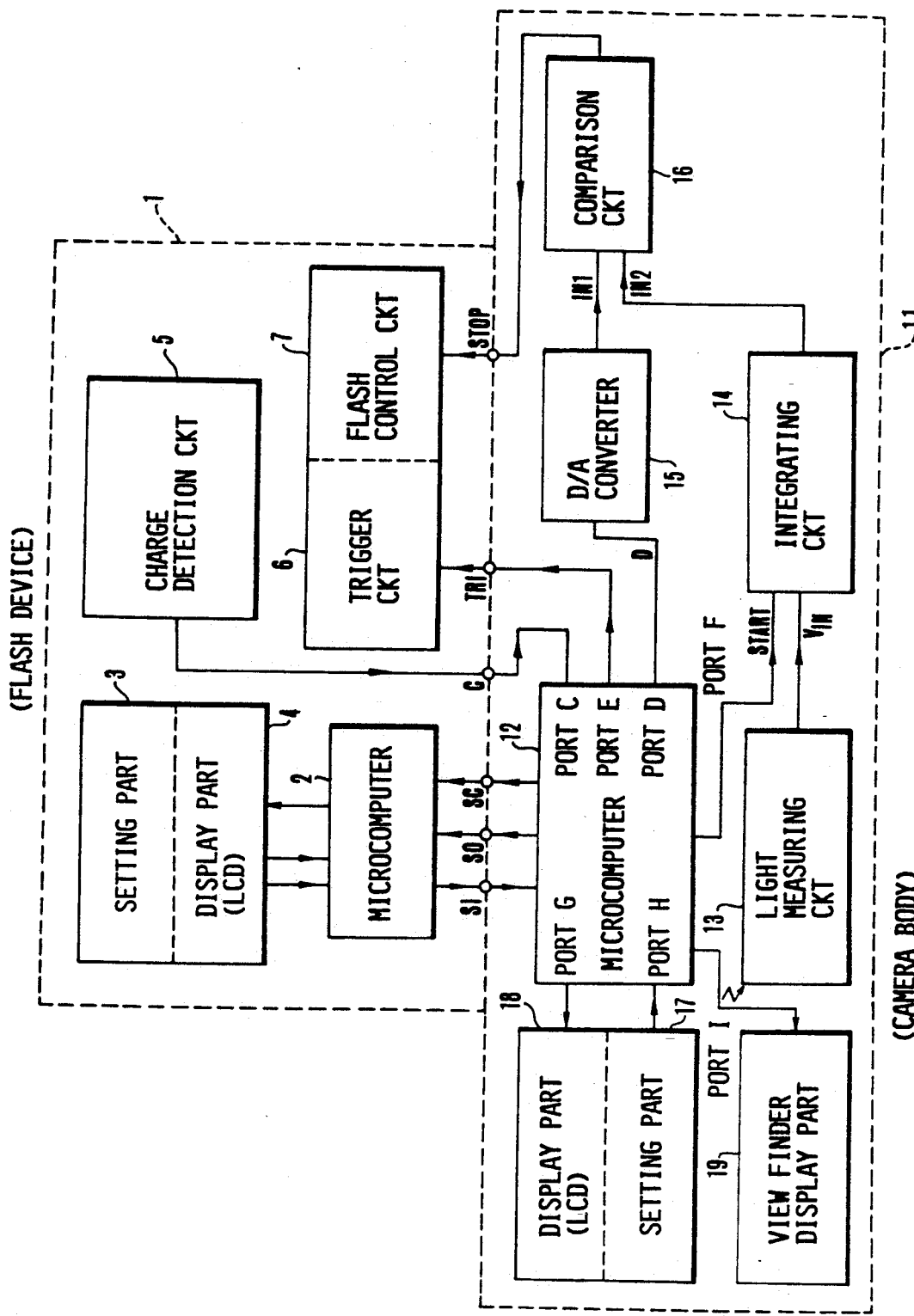
FIG. 18 is a circuit diagram showing a further embodiment of the invention.

FIG. 18 is a block diagram showing a further embodiment of this invention. This embodiment differs from the embodiment shown in FIG. 11 in the following point: information on the correction value set at the setting part 3 is arranged to be sent out from a port I of a microcomputer 12 which is disposed within the camera body 11 along with information on the aperture value and completion of charging to a view finder display part 19 to have the information displayed within the view finder.

Figure 19:
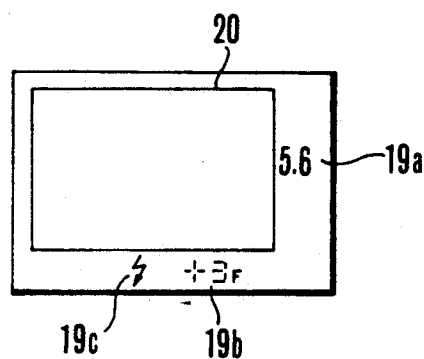
FIG. 19 shows a display mode within the view finder of a camera shown in FIG. 18.

FIG. 19 shows by way of example the above-stated view finder display. Referring to FIG. 19, a view finder 20 includes a display part 19a for displaying information on the aperture value; a display part 19b for information on the flash control level correction value; and another display part 19c for information showing completion of the charging process of the flash device.

Figure 20:
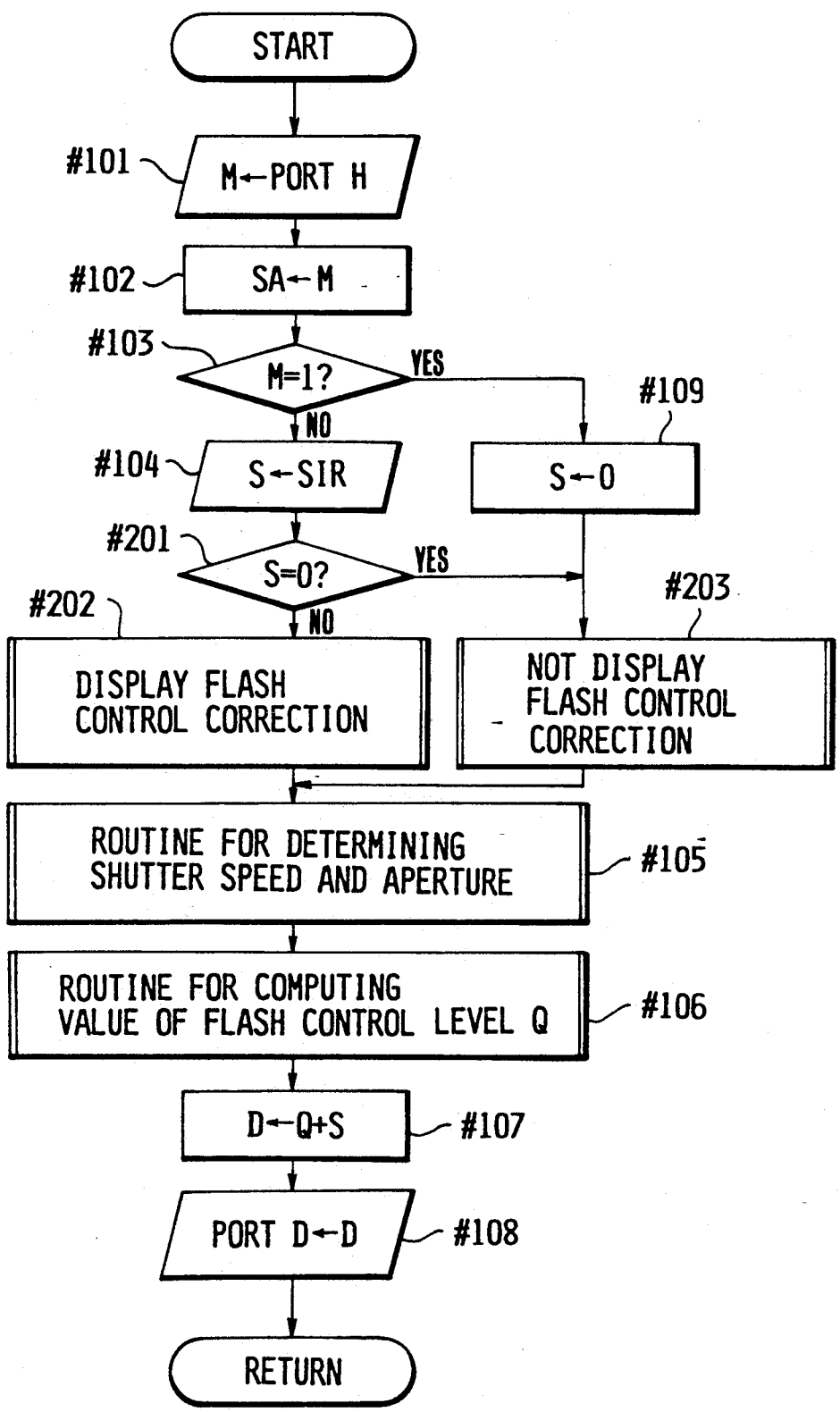
FIG. 20 is a program flow chart showing a program of a microcomputer 12 shown in FIG. 18.

FIG. 20 shows in a flow chart a program provided for the microcomputer 12. The flow chart corresponds to that of FIG. 15(b). In this program, the routines which are shown in FIGS. 15(a) and 15(c) are arranged in the same manner. However, the flash device processing routine of FIG. 15(b) is changed, for example, as shown in FIG. 20. In FIG. 20, the parts for the same actions as in the case of FIG. 15(b) are indicated by the same step numbers and the details of them are omitted from the following description. Meanwhile, the other microcomputer 2 which is disposed within the flash device is provided with a program which is exactly the same as the program shown in FIG. 12. Therefore, the program of the microcomputer 2 is also omitted from the following description.

In case that a photographing mode other than the full automatic photographing mode is selected at the setting part 17, the microcomputer 12 operates as follows: since the mode selected is not the full automatic mode, the value M is at 0. Therefore, the flow of operation comes from a step #103 to a step #104. Further, the correction value S is assumed to have been set at 1 and the data indicative of this is assumed to have been received from the flash device.

Step #104: The correction value S which has been set by the flash device 1 and obtained through the serial communication mentioned in the foregoing is read out from a serial data register IR. The flow then comes to a step #201. Step #201: A check is made to find if the correction value S is 0. If so, the flow comes to a step #203. If not, the flow comes to a step #202. Since the value S is 1 in this instance, the flow comes to the step #202. Step #202: The set correction value S is displayed, for example, within the view finder 20 as "1" in this case at the display part 19b of FIG. 19. This indicates that a flash control correcting action will be performed. The flow then comes to a step #105.

If no correction value is set, the flow branches out from the step #201 to a step #203. Step #203: The display part 19b either makes no display or makes a display "0" to show that no flash control correcting action will be performed. The flow then comes to the step #105.

In case that the full automatic photographing mode is set at the setting part 17, the microcomputer 12 operates as follows: the value M is "1" in this case. The flow, therefore, branches out from the step #103 to a step #109. Step #109: A value "0" is substituted for the variable S which represents the above-stated correction value. The flow comes to the step #203. Step #203: The display part 19b makes no display and thus shows that no flash control correcting action will be performed. The flow then comes to the step #105.

The embodiment is thus arranged to display the correction value setting state within the view finder to inform the photographer as to whether the flash control correcting action will be performed or not.

Figure 21:
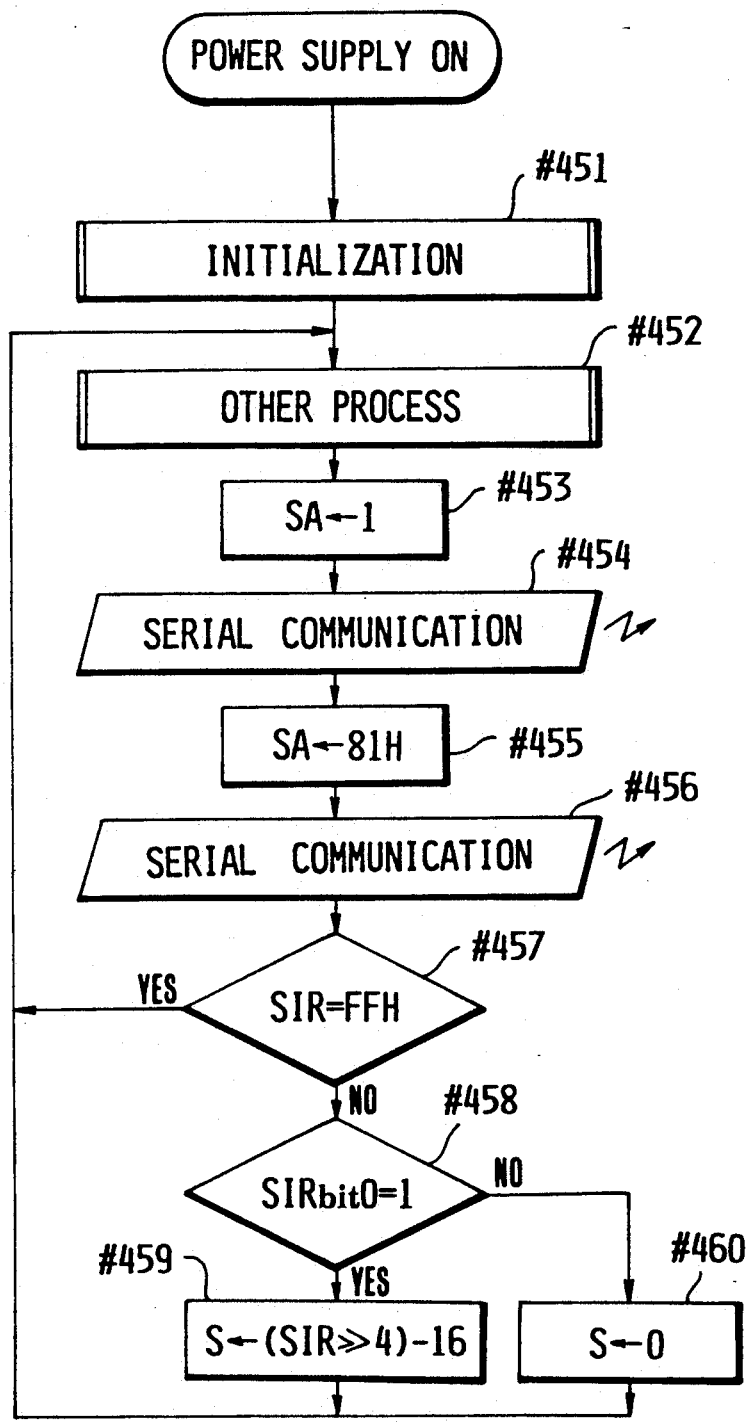
FIGS. 21 and 22 are flow charts showing other programs of the microcomputer 12.
Figure 22:
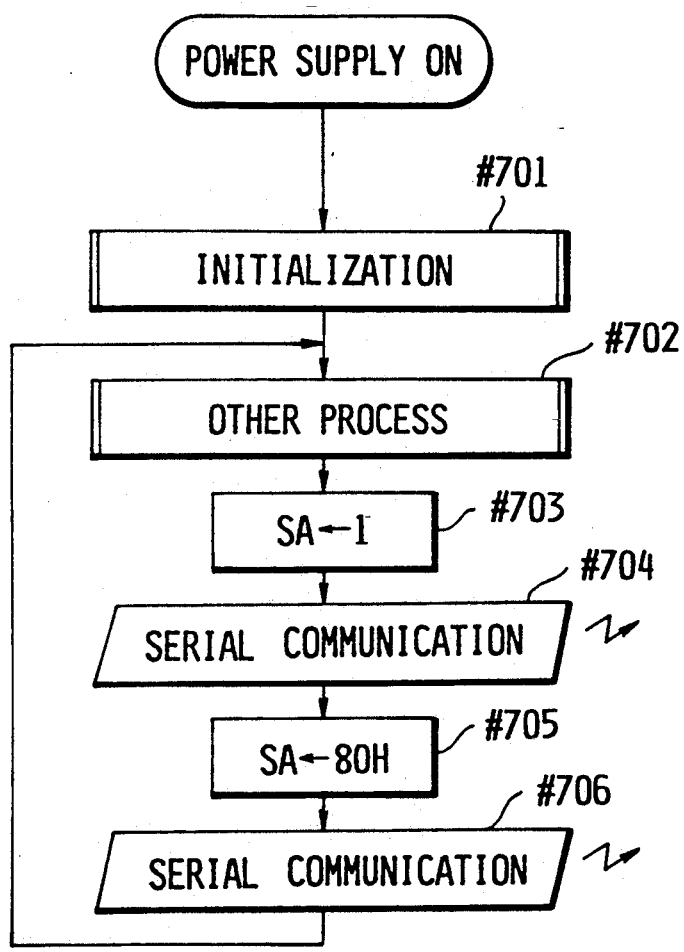

FIGS. 21 and 22 are flow charts showing other program examples of the microcomputer 12 which is employed in the embodiment shown in FIG. 11. In the case of FIG. 21, the camera body 11 is arranged as shown in FIG. 11 and includes a microcomputer 12 which is capable of executing a program as shown in FIG. 21. In the case of FIG. 22, the camera body 11 does not include the D/A converter 15, etc., and the microcomputer 12 is incorporated in a camera which is incapable of carrying out any flash control correcting action according to a correction value.

Figure 23:
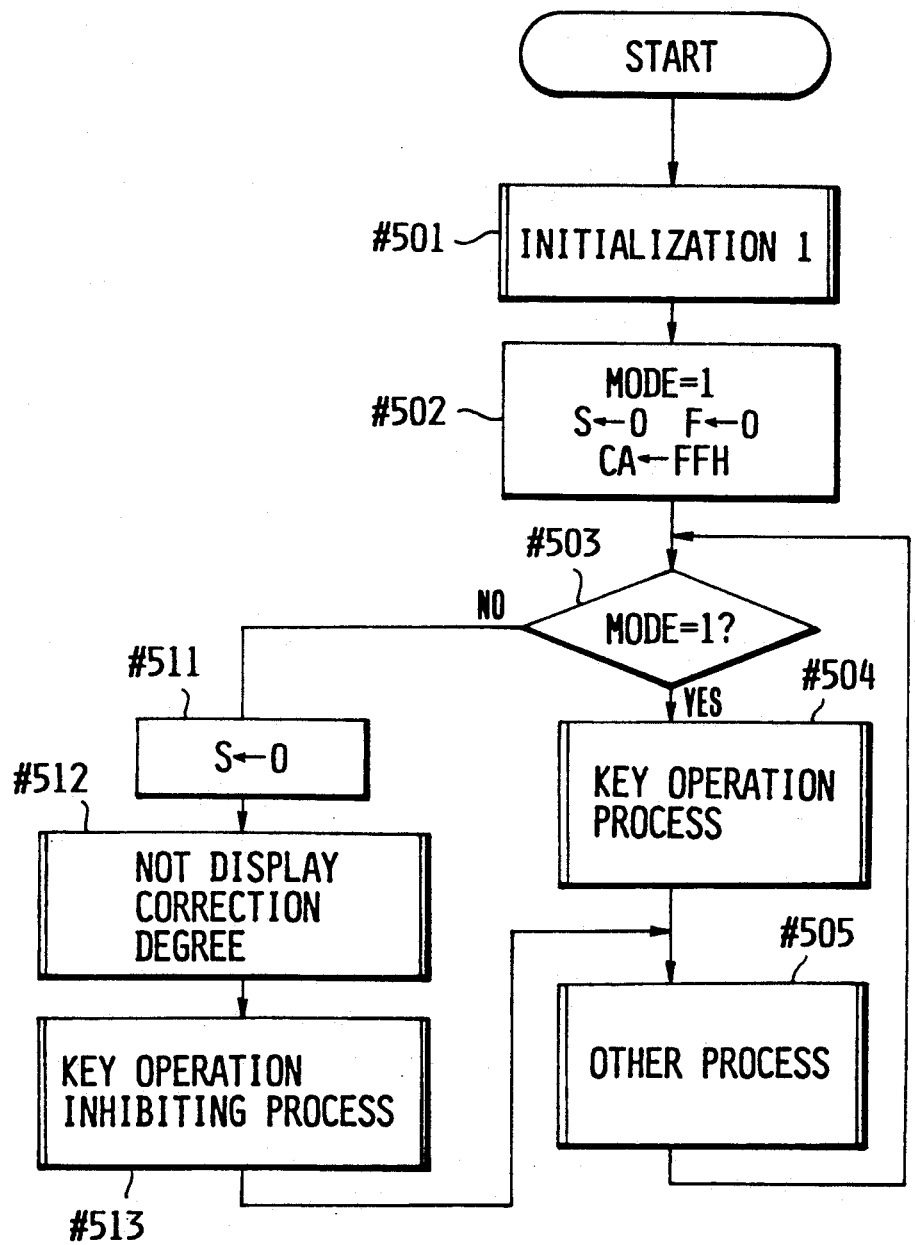
FIG. 23 is a flow chart showing a program of a microcomputer 2 shown in FIG. 18.
Figure 24:
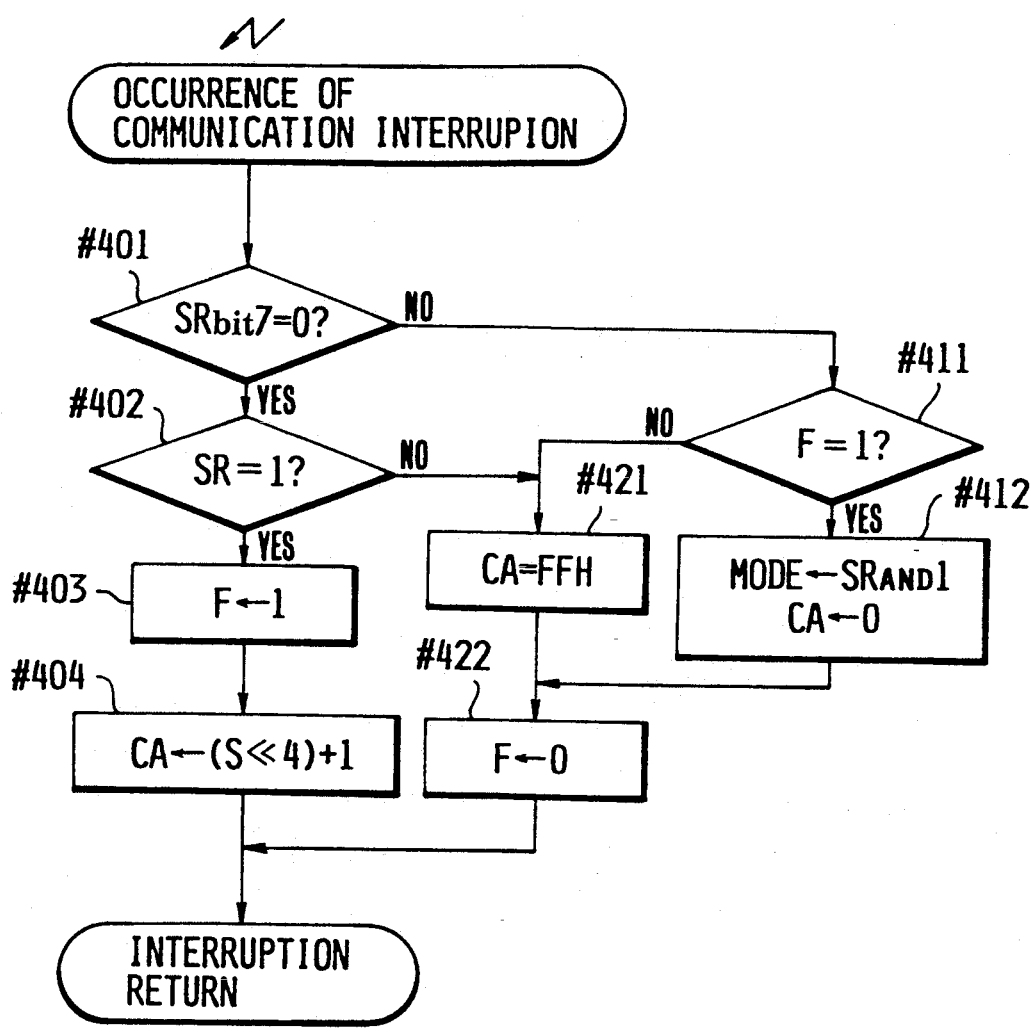
Figure 29A:
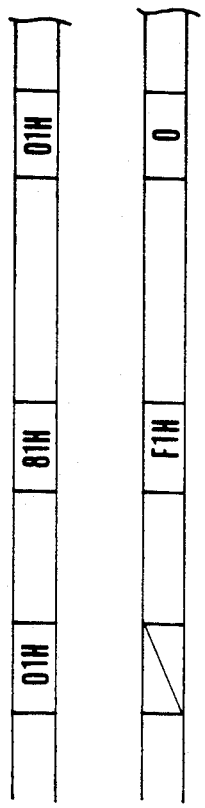
FIGS. 29(a), 29(b), 29(c) and 29(d) show operations for different combinations shown in FIG. 28.
Figure 29B:
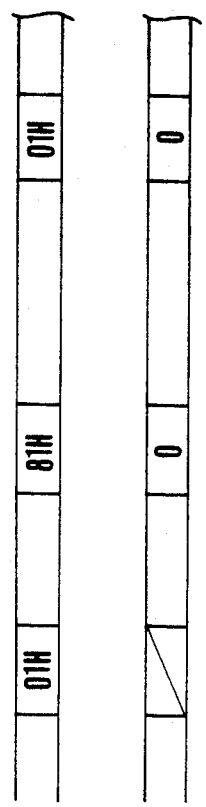
Figure 29C:
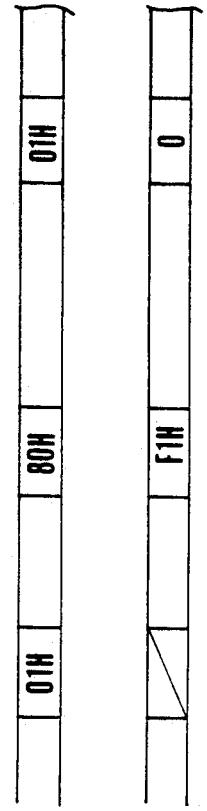
Figure 29D:
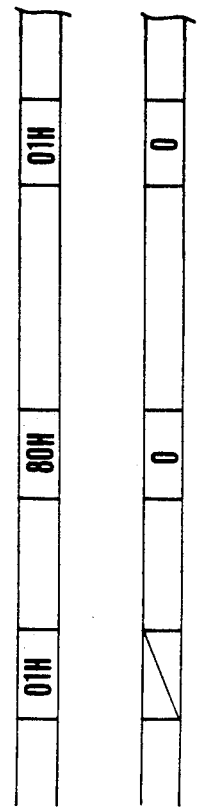

FIGS. 23 and 24 are flow charts showing programs provided for a microcomputer 2 which is disposed within a flash device arranged as shown in FIG. 11 and to permit setting of a flash control correction value. FIGS. 25(a) and 25(b) are flow charts showing programs provided for a microcomputer 2 disposed within a flash device which is arranged in the same manner as shown in FIG. 11 except that the setting part 3 of the flash device 1 of FIG. 11 is not included and the correction value cannot be set.

The flash device 1 including the microcomputer 2 which has the above-stated program and the camera body 11 including the microcomputer 12 are arranged to have serial communication in a manner as described below:

Serial data received from the flash device 1 is stored by a serial register SIR which is disposed within the microcomputer 12 of the camera body 11. Serial data to be sent from the camera body 11 to the flash device 1 is stored by a serial register SA. At the microcomputer 2 disposed within the flash device 1, the serial data coming from the camera body 11 is stored by a serial register SR. The serial data to be sent out to the camera body 11 is stored by a serial register CA.

A serial clock signal is produced from the camera body 11. In synchronism with this signal, serial data communication in eight bits is simultaneously performed between the flash device 1 and the camera body 11. FIG. 26 shows the format of the communication. FIG. 27 shows the timing of the communication.

First, the camera body 11 makes a request DR to the flash device 1 for interchangeable communication. Then, at the same time, the serial data is sent out from the flash device 1 to the camera body 11. As apparent from FIG. 26, no definition is given for the serial data in particular. Next, flash control level (adjusting) mode data CC is sent from the camera body 11 to the flash device 1. At the same time, serial data SH is sent from the flash device to the camera body 11. The correction degree is defined for the serial data SH as shown in FIG. 26. The above-stated two 8-bit communication data groups are thereafter repeatedly exchanged in a manner as shown in FIG. 27.

The interchangeable combinations between the flash device 1 and the camera body 11 are as shown in FIG. 28. As shown, the combinations are classified into cases I to IV. In the following description of these cases, the flash device which permits setting of a correction degree indicating a variable extent of the flash control level is assumed to have a correction degree −1 set there before the serial communication.

(1) Case I (wherein a flash device having a microcomputer 2 arranged therein to have the programs of FIGS. 23 and 24 mounted on a camera body having a microcomputer 12 arranged therein to have the program of FIG. 21):

Referring to FIG. 21, the microcomputer 12 disposed within the camera body 11 operates as follows: the program begins from a step #451. Step #451: An initializing action is performed. This action and the action at a next step #452 are irrelevant to this invention. Therefore, the details of them are omitted from description. Step #453: For a next step of communication to the flash device 1, "1" is substituted for the data of register SA. The flow comes to a step #454.

Step #454: The value of the register SA (DR of FIG. 27) is sent out from the terminal SO to the flash device 1 along with the serial clock signal. The flow then comes to a step #455. Step #455: A value 81H (H: hexadecimal) indicating that the flash control level is variable is substituted for the data of register SA. The flow comes to a step #456. Step #456: The value of the register SA is supplied from the terminal SO to the flash device 1 along with the serial clock signal (transmission of data CC of FIG. 27). The flow comes to a step #457. Step #457: Data stored at the register SIR by the communication made from the flash device to the camera body concurrently with data communication made at the step #456 from the camera body to the flash device is checked to see if it is FFH. Since the value stored at the register SIR is F1H (= −1) in this instance, the flow comes to a step #458. In other words, the value of the register SIR is assumed to be set at −1 through the communication of data SH as shown in FIG. 27.

Step #458: The value of bit 0 of the register SIR (the value of b0 of the serial data SH as shown in FIG. 26) is examined to see if it is at "1". In other words, a check is made to find if the flash device 1 is of the kind permitting setting of a correction value. Since the value of the register SIR is at F1H at that moment, the flow comes to a step #459. Step #459: A value "15" which is obtained by shifting by four bits to the right the data of register SIR (8 bits) is subtracted from "16". The result of the subtraction (−1) is substituted for the correction value variable S. The flow then comes back to the step #452. After that, the above-stated steps are repeated.

Next, referring to FIGS. 23 and 24, the operation of the microcomputer 2 of the flash device 1 is as follows: FIG. 23 shows the main program of the microcomputer 2. When the power supply to the flash device 1 is switched on, the program begins from a step #501.

Step #501: An initializing action is performed (the details of the action is omitted). The flow comes to a step #502. Step #502: A variable MODE which indicates whether the system is in the correction value setting mode is set at 0. The variable S which indicates the correction value is set at 0. A value FFH is substituted for the data of the register CA. The flow then comes to a step #503. Step #503: A check is made to see if the variable M is at 1. Since it is at 1 at this moment, the flow comes to a step #504. Step #504: The key SW of the setting part 3 is operated to set the correction value variable S. The variable S is assumed to be set at −1 in this case. The flow comes to a step #505. Step #505: A process which is irrelative to this invention is performed. After that the flow again comes to the step #503. Then, the program is repeatedly executed in the sequence of steps #503-#504-#505-#503 as long as the variable MODE remains at 1.

In the main routine shown in FIG. 23, the variable MODE is never set at any value other than 1. The variable MODE, however, might be changed to some other value in the case of a communication process program which is as shown in FIG. 24. The communication process program is as follows: when an interruption by the data DR takes place for the first time as shown in FIG. 27, the main program comes to a stop halfway and the communication process program begins at a step #401.

Step #401: The register SR (=1) is checked to find if the value of bit 7 of the data received from the camera body 11 and stored there is 1 (for discrimination between data CC and DR of FIG. 27). Since the bit 7 of the data DR is at 0 in this case, the flow comes to a step #402. Step #402: The value of the register SR is checked to find if it is at 1. Since the value is at 1 in this case, the flow comes to a step #403.

Step #403: A flag F is set at "1" and the flow comes to a step #404. Step #404: A value of F1H is obtained by adding 1 to a value F0H obtained by shifting to the left by 4 bits the value of the correction value variable S which is defined by the main program to be FFH (8 bits). This value F1H is substituted for the data of the register CA. The data of the register CA is supplied to the camera body as serial data at the time of SH as shown in FIG. 27 at a next serial communication step.

When the interruption by the serial communication from the camera body 11 takes place for a second time (CC and SH as shown in FIG. 27), the main program comes to a stop halfway and this program begins from the step #401.

Step #401: The value of the bit 7 of the register SR (81H), i.e., the value of b7 of the serial data CC (as shown in FIG. 27) which is received through the serial communication from the camera body 11 is checked to find if it is 1. Since the bit 7 is 1 in this instance, the flow branches out to a step #411. Step #411: The value of the flag is checked to see if it is 1. Since the flag has been set at 1 at the first step of communication, the flow proceeds to a step #412. Step #412: A logical product computing operation is performed on the register SR (81H) and the value 1. The result "1" of the computing operation is substituted for the variable MODE and "0" for the data of the register CA. The flow then comes to a step #422. The data of the register CA is supplied as serial data to the camera body 11 at a next step of serial communication. Step #422: The flag is set at 0.

The communication process program then comes to an end. The flow then comes back to the main program to resume execution thereof from a part at which it has been held in abeyance.

FIG. 29 shows the serial communication. In the case I, the data 0 set at the register CA at the step #412 is transmitted from the camera body to the flash device every time the communication is made at the step #454. Further, the data 81H is transmitted also to the flash device every time the serial communication is made at the step #456. Meanwhile, from the flash device to the camera body, the correction value S which is last set at the register CA is transmitted as data F1 at the step #404. Therefore, control can be accomplished on the basis of the set correction value S.

(2) Case II (where a flash device which includes the microcomputer 2 having the programs of FIGS. 25(a) and 25(b) is mounted on a camera body which includes the microcomputer 12 having the program of FIG. 21):

In this case, the microcomputer 12 of the camera body 11 is the same as in Case I described above. Therefore, the operation of the microcomputer 12 is omitted from the following description. Meanwhile, the microcomputer 2 of the flash device 1 operates as described below with reference to FIGS. 25(a) and 25(b):

FIG. 25(a) shows the main program of the microcomputer 2. The main program begins when a power supply to the flash device 1 is switched on. Step #551: An initializing action is performed. (Details of it are omitted.) The flow comes to a step #552: The flag F is set at 0. The register CA is also initialized by substituting FFH for the data thereof. After that, the flow comes to a step #553. At the step #553, a process irrelative to this embodiment is performed. After that, the flow again comes to the step #553 to repeat the same thereafter.

Referring to FIG. 25(b), the communication process program is as follows: when an interruption by the serial communication from the camera body 11 takes place (the first data DR as shown in FIG. 27), this program begins at a step #601 with the main program left in abeyance. Step #601: The value of the bit 7 of the data DR (=1) which is received by the serial communication from the camera body 11 is stored at the register SR is examined to find if it is at 1. Since the bit 7 of the data DR is at 0 at this moment, the flow comes to a step #602. Step #602: A check is made to find if the value of the register SR is at 1. Since it is at 1, the flow proceeds to a step #603. Step #603: The flag is set at 1. The flow proceeds to a step #604. Step #604: A value 0 is substituted for the data of the register CA. The data of the register CA is supplied as the serial data SH of FIG. 27 to the camera body at a next step of the serial communication.

This brings the communication process program to an end. The main program is then resumed from the part at which it has been held in abeyance.

When an interruption by the serial communication again takes place (transmission of data SH and CC as shown in FIG. 27), the program begins from the step #601 with the main program again left in abeyance. Step #601: The value of bit 7 of the data 81H which is received as data CC through the serial communication from the camera body 11 and is stored at the register SR (81H) is checked to see if it is at 1. Since the bit 7 is at 1 at that moment, the flow comes to a step #621. Step #621: The value of the flag F is checked to see if it is at 1. Since the flag F is at 1, the flow comes to a step #622.

Step #622: A value 0 is substituted for the data of the register CA. The flow comes to a step #612. The data of the register CA is supplied as serial data to the camera body 11 at a next step of the serial communication. Step #612: The flag F is set at 0. This brings the communication process program to an end. The main program is resumed at the part at which it has been held in abeyance. The state of serial communication in Case II is also shown in FIG. 29.

In other words, in this case, the data set at the register CA at the step #622 is transmitted to the camera body through the communication made at the step #454 of FIG. 21. Further, the data which is set at the register CA at the step #604 is transmitted also to the camera body through the communication made at the step #456. In this instance, since the register CA is set at 0, the camera performs a correcting action on the basis of the above-stated set correction value S.

(3) Case III (where a flash device including the microcomputer 2 which has the programs of FIGS. 23 and 24 is mounted on a camera including the microcomputer which has the program of FIG. 22):

Referring to FIG. 22, the microcomputer 12 disposed within the camera body operates as follows: the program of the microcomputer 12 begins at a step #701. At the step #701: An initializing action is performed. This action and the process of a next step #702 do not represent any feature of the invention. Therefore, the details of them are omitted from the following description, which begins with a step #703.

Step #703: A value 1 is substituted for the data of the register SA. The flow of the program then proceeds to a step #704. Step #704: The value of the register SA is supplied via the terminal SO to the flash device 1 as the communication data DR of FIG. 27. The flow then proceeds to a step #705. Step #705: A value 80H is substituted for the data of the register SA. The flow proceeds to a step #706. Step #706: The value 80H of the register SA is supplied via the terminal SO to the flash device 1 as the communication data CC of FIG. 27. After that, the flow comes back to the step #452 to repeat the operation described in the foregoing.

Next, the operation of the microcomputer 2 which is disposed within the flash device 1 is described as follows with reference to FIGS. 23 and 24: when a power supply to the flash device 1 is switched on, the program of the microcomputer 2 begins at the step #501. Further, as long as the variable MODE remains at 1, the program is repeatedly executed in the sequence of steps #503-#504-#505-#503 as mentioned in the foregoing.

Meanwhile, when the serial communication takes place between the camera body and the flash device, the above-stated variable MODE changes to 0, as will be further described later in the description of the flow of the communication process program. After the serial communication, the flow branches out from the step #503 to the step #511.

Figure 30A:
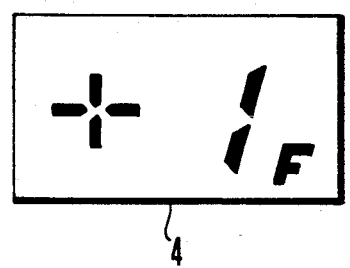
FIGS. 30(a) and 30(b) show displays made by a display part 4 of FIG. 11.
Figure 30B:
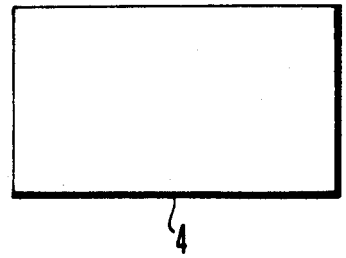

At the step #511: The value "0" is substituted for the correction value variable S. The flow then proceeds to the step #512. At the step #512, a figure representing the correction value S is unlighted to show that the camera system is not in the flash control correction mode, as shown in FIGS. 30(a) and 30(b). The flow then comes to the step #513. At the step #513, any operation on the keys +SW and −SW of the setting (operation) part 3 is inhibited. The flow comes to the step #505.

In this case, the operation of the microcomputer 2 for the serial communication is performed as follows: when the data DR is transmitted to the flash device at the step #704 of FIG. 22, the steps #401 to #404 of FIG. 24 are executed in the same manner as in Case I described in the foregoing. Then, at the time of transmission of data 80H as the serial data CC at the step #706 of FIG. 22, the data of the register CA set at the step #404, i.e., the set correction value S is sent to the camera body. Further, with the data 80H sent to the flash device, the operation of the microcomputer 2 comes to the steps #401, #411 and #412 of FIG. 24. Since the serial data CC or 80H has been supplied to the register SR at that time, the variable MODE becomes 0. Therefore, the variable MODE is judged to be 0 at the step #503 of the main program shown in FIG. 23. As a result, the steps #511, #512 and #513 are executed. In this case, however, the correction value display of the display part 4 remains unlighted. The manner in which the serial communication is performed by the combination of Case III is also shown in FIG. 29.

(4) Case IV (where a flash device including the microcomputer 2 which has the program of FIG. 25 is mounted on a camera body including the microcomputer 12 which has the program of FIG. 22):

The microcomputer 12 disposed within the camera body operates to execute the steps #701 to #706 of FIG. 22. However, since this operation is the same as in Case III described above, the details of its operation are omitted from the following description.

The microcomputer 2 disposed within the flash device operates to execute the steps #551 to #553 of FIG. 25(a) and the steps #601 to #604, #611, #612, #621 and #622 of FIG. 25(b). This operation is the same as in Case II described in the foregoing. The details of it are therefore also omitted from description. FIG. 29 shows the manner in which the serial communication is performed by the combination of case IV.

What is claimed is:

1. A camera system using a flash device for flash photography, comprising:
   a) a light quantity control circuit which controls the degree of exposure of flash photography by taking into consideration the quantity of flash light emitted from said flash device;
   b) a correction degree setting circuit which permits manual setting of a correction degree, said light quantity control circuit being arranged to control the degree of exposure by shifting said degree of exposure to an extent corresponding to said correction degree set by said setting circuit;
   c) photographing mode setting means for setting one of photographing modes of the camera; and
   d) a cancel circuit which is arranged to cancel said correction degree set by said setting circuit when a specific photographing mode is selected by said mode setting means, whereby when the specific photographing mode is set, the exposure amount of the flash photography is controlled by said light quantity control circuit irrespective of the correction degree set in said setting circuit.

2. A system according to claim 1, further comprising a display circuit which is arranged to display the correction degree set by said correction degree setting circuit and to make a display indicating that no correction is made when said specific photographing mode is selected by said photographing mode setting means.

3. A system according to claim 1, wherein said light quantity control circuit includes an integrating circuit for integrating the quantity of reflection light of flash light coming from an object to be photographed through a photo taking lens of the camera and a stop circuit for bringing a flashing action to a stop on the basis of an output of said integrating circuit; and said light quantity control circuit is arranged to adjust time for stopping said flashing action on the basis of the correction degree set by said correction degree setting circuit.

4. A system according to claim 2, wherein said display circuit is arranged to make a display within a view finder of the camera.

5. A camera system using a flash device for flash photography, comprising:
 a) a light quantity control circuit which controls the degree of exposure of flash photography by taking into consideration the quantity of flash light emitted from said flash device;
 b) a correction degree setting circuit which permits manual setting of a correction degree, said light quantity control circuit being arranged to control the degree of exposure by shifting said degree of exposure to an extent corresponding to said correction degree set by said setting circuit;
 c) photographing mode setting means for setting one of photographing modes of the camera;
 d) a display circuit which is arranged to make a display indicating the correction degree set by said correction degree setting circuit; and
 e) a display control circuit arranged to shift a display state of said display circuit to a display different from said display of said set correction degree when a specific mode is selected by said photographing mode setting means.

6. A system according to claim 5, wherein said light quantity control circuit includes an integrating circuit for integrating the quantity of reflection light of flash light coming from an object to be photographed through a photo taking lens of the camera and a stop circuit for bringing a flashing action to a stop on the basis of an output of said integrating circuit; and said light quantity control circuit is arranged to adjust time for stopping said flashing action on the basis of the correction degree set by said correction degree setting circuit.

7. A system according to claim 5, wherein said display circuit is arranged within a view finder of the camera.

8. A camera system including a camera and a flash device, said system having a flash light quantity control mode in which a length of time of flashing by said flash device is controlled by detecting the quantity of reflection light on a film surface resulting from flash light emitted by said flash device and reflected by an object to be photographed and the flashing time is corrected according to a manually set correction degree, comprising:

a) a light quantity adjusting circuit which is arranged to adjust said flashing time by detecting said quantity of reflected light;
 b) a correction circuit which is arranged to provide said adjusting circuit with information on said correction degree for said correction; and
 c) a correction control circuit arranged to render said correction circuit inoperative when the camera is in a specific photographing mode, whereby when the specific photographing mode is set, the flash time is controlled by said light quantity adjusting circuit irrespective of the correction degree.

9. A flash device mountable either on a first camera which has a correcting function and arranged to received information on a correction degree from the flash device and to correct the degree of exposure for flash photography on the basis of the correction degree information received or a second camera which is devoid of said correction function, comprising:
 a) a correcting degree setting circuit arranged to permit manual setting of said correcting degree;
 b) a discriminating circuit for discriminating the kind of the camera on which said flash device is mounted between said first and second cameras; and
 c) a cancel circuit arranged to cancel out the setting value set at said correction degree setting circuit when said flash device is found to be mounted on said second camera.

10. A device according to claim 9, further comprising a flash tube and a stop control circuit which controls termination of flashing of said flash tube, and wherein said first camera includes a light quantity detecting circuit which is arranged to receive the reflection on a film surface of the reflection light of flashing coming, through a photo-taking lens, from an object to be photographed and to produce an output when the quantity of light thus received reaches a predetermined value, and a correction circuit which is arranged to correct, in accordance with said correction degree, the timing of generation of the output of said light quantity detecting circuit, said stop control circuit of the flash device being arranged to be rendered operative to terminate said flashing by the output of said light quantity detecting circuit.

11. A flash device mountable either on a first camera which has a correcting function and arranged to receive information on a correction degree from the flash device and to correct the degree of exposure for flash photography on the basis of the correction degree information received or a second camera which is devoid of said correcting function, comprising:
 a) a correcting degree setting circuit arranged to permit manual setting of said correcting degree;
 b) a discriminating circuit for discriminating the kind of the camera on which said flash device is mounted between said first and second cameras; and
 c) a display circuit arranged to make one of different displays according to the result of discrimination made by said discriminating circuit between said first and second cameras, wherein said display circuit is arranged to display the set value of said correction degree when the flash device is found to be mounted on said first camera by said discriminating circuit and to make no display when the flash device is found to be mounted on said second camera.

12. A flash device to be mounted on a camera having a light receiving element which is arranged to receive the reflection on a film surface of the reflection light of flashing coming through a photo-taking lens from an object to be photographed and an output circuit which is arranged to produce an output when the integrated value of the output of said light receiving element reaches a given value which is determined by taking into consideration a correction value received from said flash device, comprising:
   a) a correction value setting circuit which is arranged to permit said correction value to be set by a manual setting operation;
   b) a cancel circuit which is arranged to cancel out the correction value set at said setting circuit when a mode set by a mode setting means is a specific mode;
   c) a flash tube; and
   d) a stop circuit arranged to stop said flashing in response to the output of said output circuit, whereby when the specific mode is set the flash output is controlled irrespective of the correction value.

13. A flash device to be mounted on a camera having a light receiving element which is arranged to receive the reflection on a film surface of the reflection light of flashing coming through a photo-taking lens from an object to be photographed and an output circuit which is arranged to produce an output when the integrated value of the output of said light receiving element reaches a given value which is determined by taking into consideration a correction value received from said flash device, comprising:
   a) a correction value setting circuit which is arranged to permit said correction value to be set by a manual setting operation;
   b) a display circuit for displaying a correction value set at said correction value setting circuit;
   c) a display control circuit arranged to cause said display circuit to change said correction value display into a different display when a mode set by the mode setting means of the camera is a specific mode;
   d) a flash tube; and
   e) a stop circuit arranged to stop said flashing in response to the output of said output circuit.

14. A flash device to be mounted on a camera having a light receiving element which is arranged to receive the reflection on a film surface of the reflection light of flashing coming through a photo-taking lens from an object to be photographed and an output circuit which is arranged to produce an output when the integrated value of the output of said light receiving element reaches a given value which is determined by taking into consideration a correction value received from said flash device, comprising:
   a) a correction value setting circuit which is arranged to permit said correction value to be set by a manual setting operation;
   b) warning means for warning that said output circuit produces an output disregarding a correction value set by said correction value setting circuit when a mode set by mode setting means of said camera is a specific mode;
   c) a flash tube; and
   d) a stop circuit arranged to stop said flashing in response to the output of said output circuit.

15. A camera having a flash light quantity control circuit arranged to detect, with a flash device having a correction value setting circuit mounted on said camera, the light quantity of the reflection on a film surface of the reflection light which is caused by flashing of the flash device and comes from a photographing object through a photo taking lens and to produce and supply a flashing stop signal to said flash device when the light quantity reaches a value corresponding to a correction value set by said correction value setting circuit, comprising:
   a) a mode setting circuit which is arranged to permit selection of a photographing mode; and
   b) and inhibiting circuit for inhibiting said flash light quantity control circuit from performing control in accordance with said correction value when a specific mode is selected by said mode setting circuit, whereby when the specific mode is set the light amount is controlled irrespective of the correction value.

16. A camera system composed of a camera and a flash device having a capacitor for storing energy for light flux projection by said flash device, said system comprising:
   (a) light amount detection means for detecting light flux projected by the flash device which is reflected by an object;
   (b) set means for setting a correction value; and
   (c) control means for controlling light flux projection by said flash device in accordance with the correction value set by said set means, said control means starting computation using said correction value responsive to an attainment of charge completion of said capacitor.
   wherein said flash device is arranged to be connectable to the camera, the set means is provided in the flash device and the control means is provided in the camera.

17. A camera system composed of a camera and a flash device having a capacitor for storing energy for light flux projection by said flash device, said system comprising:
   (a) light amount detection means for detecting light flux projected by the flash device which is reflected by an object;
   (b) set means for setting a correction value; and
   (c) control means for controlling light flux projection by said flash device in accordance with the correction value set by said set means, said control means starting computation using said correction value responsive to an attainment of charge completion of said capacitor,
   wherein said flash device is arranged to be connectable to the camera, the set means is provided in the flash device and the control means is provided in the camera, and
   wherein the correction value set by the set means is input to the control means upon said attainment of said charge completion of said capacitor.

18. A camera system composed of a camera and a flash device attachable to the camera, comprising:
   (a) a correction value setting circuit provided in the flash device to output a set correction value as a digital value;
   (b) communication means for serially transmitting said set digital correction value from said flash device to said camera; and (c) control means provided in the camera for controlling a light amount for flash photography correspondingly with said serially transmitted set digital correction value.

19. A camera system according to claim 18, wherein said flash device has a first computer and said camera has a second computer, said first computer setting the correction value, which is transferred from the first computer to the second computer by the communication means.

20. A camera system according to claim 19, wherein said first and second computers are connected to a first single line which transfers data from the first computer to the second computer, a second single line which transfers data from the second computer to the first computer, and a third line which transfers a clock signal from the second computer to the first computer, whereby the correction value is transferred to the second computer through the first line in synchronism with the clock signal.

21. A camera system according to claim 19, wherein said first computer cancels the set correction value according to a mode of the camera.

* * * * *

UNITED STATES PATENT AND TRADEMARK OFFICE
CERTIFICATE OF CORRECTION

PATENT NO.  : 5,260,737
DATED       : November 9, 1993
INVENTOR(S) : Naoki Takahashi It is certified that error appears in the above-indentified patent and that said Letters Patent is hereby corrected as shown below:

Col. 1, line 39.  After "film" insert -- on --  and
                  After "which" insert -- it --

Col. 1, line 50.  After "body;" insert -- and --

Col. 1, line 64.  Change "on" to -- of --

Col. 3, line 33.  Change "shows" to -- show --

Col. 3, line 40.  After "show" insert -- communicating --

Col. 5, line 23.  Change "irrelative" to -- irrelevant --

Col. 10, line 23. Change "#208:" to -- #104: --

Col 10, line 54.  After "In" insert -- the --  and
                  Change "that" to -- where --

Col. 15, line 25. After "In" insert -- the --  and
                  Change "that" to -- where --

Col. 17, line 28. Change "irrelative" to -- irrelevant --

Col. 18, line 45. Change "irrelative" to -- irrelevant --

Col. 21, line 13,50. Change "photo taking" to -- photo-taking --

Col. 22, line 15. Change "received" to -- receive --

UNITED STATES PATENT AND TRADEMARK OFFICE
CERTIFICATE OF CORRECTION

PATENT NO. : 5,260,737
DATED : November 9, 1993
INVENTOR(S) : Naoki Takahashi

It is certified that error appears in the above-indentified patent and that said Letters Patent is hereby corrected as shown below:

Col 24, line 7.   Change "photo taking" to -- photo-taking --

Signed and Sealed this

Twenty-ninth Day of March, 1994

Attest:

BRUCE LEHMAN

Attesting Officer      Commissioner of Patents and Trademarks